US009894290B2

(12) United States Patent
Taguchi

(10) Patent No.: US 9,894,290 B2
(45) Date of Patent: Feb. 13, 2018

(54) LENS UNIT, CAMERA SYSTEM, AND CONTROL METHOD FOR APERTURE

(71) Applicant: Olympus Corporation, Hachioji-shi, Tokyo (JP)

(72) Inventor: Yuzuru Taguchi, Tachikawa (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/174,004

(22) Filed: Jun. 6, 2016

(65) Prior Publication Data

US 2016/0366320 A1    Dec. 15, 2016

(30) Foreign Application Priority Data

Jun. 10, 2015  (JP) ................. 2015-117283

(51) Int. Cl.
| | |
|---|---|
| *H04N 5/238* | (2006.01) |
| *H04N 5/235* | (2006.01) |
| *H04N 5/232* | (2006.01) |

(52) U.S. Cl.
CPC .......... *H04N 5/238* (2013.01); *H04N 5/2351* (2013.01); *H04N 5/2352* (2013.01); *H04N 5/23209* (2013.01); *H04N 5/23245* (2013.01)

(58) Field of Classification Search
CPC .. H04N 5/23209; H04N 5/2352; H04N 5/238; G03B 7/00; G03B 7/003; G03B 7/006; G03B 7/08; G03B 7/085; G03B 7/087; G03B 7/095; G03B 7/097; G03B 9/02–9/07; G03B 2207/00; G02B 5/005; G02B 5/006

See application file for complete search history.

(56) References Cited

U.S. PATENT DOCUMENTS

| | | | | |
|---|---|---|---|---|
| 5,953,062 | A * | 9/1999 | Sugimori | ............... H04N 5/238 348/222.1 |
| 2010/0158506 | A1* | 6/2010 | Sekimoto | ................ G03B 9/02 396/508 |

FOREIGN PATENT DOCUMENTS

JP    2013-127527    6/2013

* cited by examiner

*Primary Examiner* — Paul Berardesca
(74) *Attorney, Agent, or Firm* — John C. Pokotylo; Pokotylo Patent Service

(57) ABSTRACT

A lens unit, having a photographing lens, an aperture, and an aperture drive mechanism for opening and closing the aperture, comprising a memory that stores characteristics of the aperture drive mechanism, an aperture drive section that drives the aperture drive mechanism, and an aperture control section that controls the aperture drive section so that rate of change of light amount that passes through the aperture as a result of opening and closing operations of the aperture becomes constant, based on the characteristics of the aperture drive mechanism.

3 Claims, 14 Drawing Sheets

LENS UNIT, CAMERA SYSTEM, AND CONTROL METHOD FOR APERTURE

Benefit is claimed, under 35 U.S.C. § 119, to the filing date of prior Japanese Patent Application No. 2015-117283 filed on Jun. 10, 2015. This application is expressly incorporated herein by reference. The scope of the present invention is not limited to any requirements of the specific embodiments described in the application.

BACKGROUND OF THE INVENTION

1. Field of the Invention

The present invention relates to a lens unit having an aperture inside, a camera system, and a control method for an aperture.

2. Description of the Related Art

In order to control exposure so as to achieve correct exposure, an aperture unit is provided within a lens unit. The aperture unit requires high speed drive at the time of still picture shooting, while requiring low speed drive at the time of movie shooting. In order to satisfy these two drive conditions, an imaging apparatus that has a motor for low speed drive and a motor for high speed drive provided in an aperture unit to cover situations from low speed to high speed, and ensures drive time and performance at the time of low speed, is proposed in Japanese patent laid-open No. 2013-127527 (hereafter referred to as patent publication 1).

By providing two motors, as with the imaging apparatus disclosed in patent publication 1, it is possible to lower drive noise at the time of still picture shooting and at the time of movie shooting, and to ensure drive stability. However, at the time of aperture drive, in a case where linearity is not ensured in change of light amount passing through the aperture as a result of drive control of an aperture drive motor, exposure will change unnaturally.

Change in light amount of subject light flux that passes through the aperture is dependent upon cam shape of an aperture unit, and change in light amount becomes non-constant due to nonlinearity of change in aperture opening area. Generally, in order to miniaturize a lens unit, the shape of a cam may be set so that change in aperture opening area becomes nonlinear. In this way, since exposure changes unnaturally because of aperture unit cam shape, it leads to unappealing images at the time of live view display and at the time of movie playback.

SUMMARY OF THE INVENTION

An object of the present invention is to provide a lens unit, camera system and aperture control method with which change in exposure does not become unnatural, even at the time of aperture drive.

A lens unit of a first aspect of the present invention is a lens unit having a photographing lens, an aperture and an aperture drive mechanism for opening and closing the aperture, and comprises a memory that stores characteristics of the aperture drive mechanism, an aperture drive section that drives the aperture drive mechanism, and an aperture control section that controls the aperture drive section so that rate of change of light amount that passes through the aperture as a result of opening and closing operations of the aperture becomes constant, based on the characteristics of the aperture drive mechanism.

A camera system of a second aspect of the present invention is a camera system comprising a lens unit having a photographing lens, an aperture, and an aperture drive mechanism for opening and closing the aperture, and a camera body that is configured to be detachable or integral with the lens unit, wherein the lens unit comprises a memory that stores characteristics of the aperture drive mechanism, an aperture drive section that drives the aperture drive mechanism, and an aperture control section that, based on the characteristics of the aperture drive mechanism, either executes first control to control the aperture drive section so that rate of change of light amount that passes through the aperture as a result of opening and closing operations of the aperture becomes constant, or executes second control to control the aperture drive section independently of the characteristics of the aperture drive mechanism, and the camera body comprises an aperture control instruction section for instructing to the aperture control section using a first aperture instruction to designate rate of change of light amount that passes through the aperture or using a second aperture instruction that does not designate rate of change of light amount that passes through the aperture, and wherein the aperture control instruction section, in a case where the aperture control instruction section has instructed to the aperture control section using the first aperture instruction, executes the first control.

An aperture control method of a third aspect of the present invention is an aperture control method for a lens unit having a photographing lens, an aperture, and an aperture drive mechanism for opening and closing the aperture, a memory that stores characteristics of the aperture drive mechanism, and an aperture drive section that drives the aperture drive mechanism, the aperture control method reading out characteristics of the aperture drive mechanism from the memory based on aperture value of the aperture, calculating drive speed of the aperture drive section so that rate of change of light amount that passes through the aperture as a result of opening and closing operations of the aperture becomes constant, based on the characteristics of the aperture drive mechanism, and controls the aperture drive section based on the calculated drive speed.

DETAILED DESCRIPTION OF THE PREFERRED EMBODIMENTS

Figure 1:
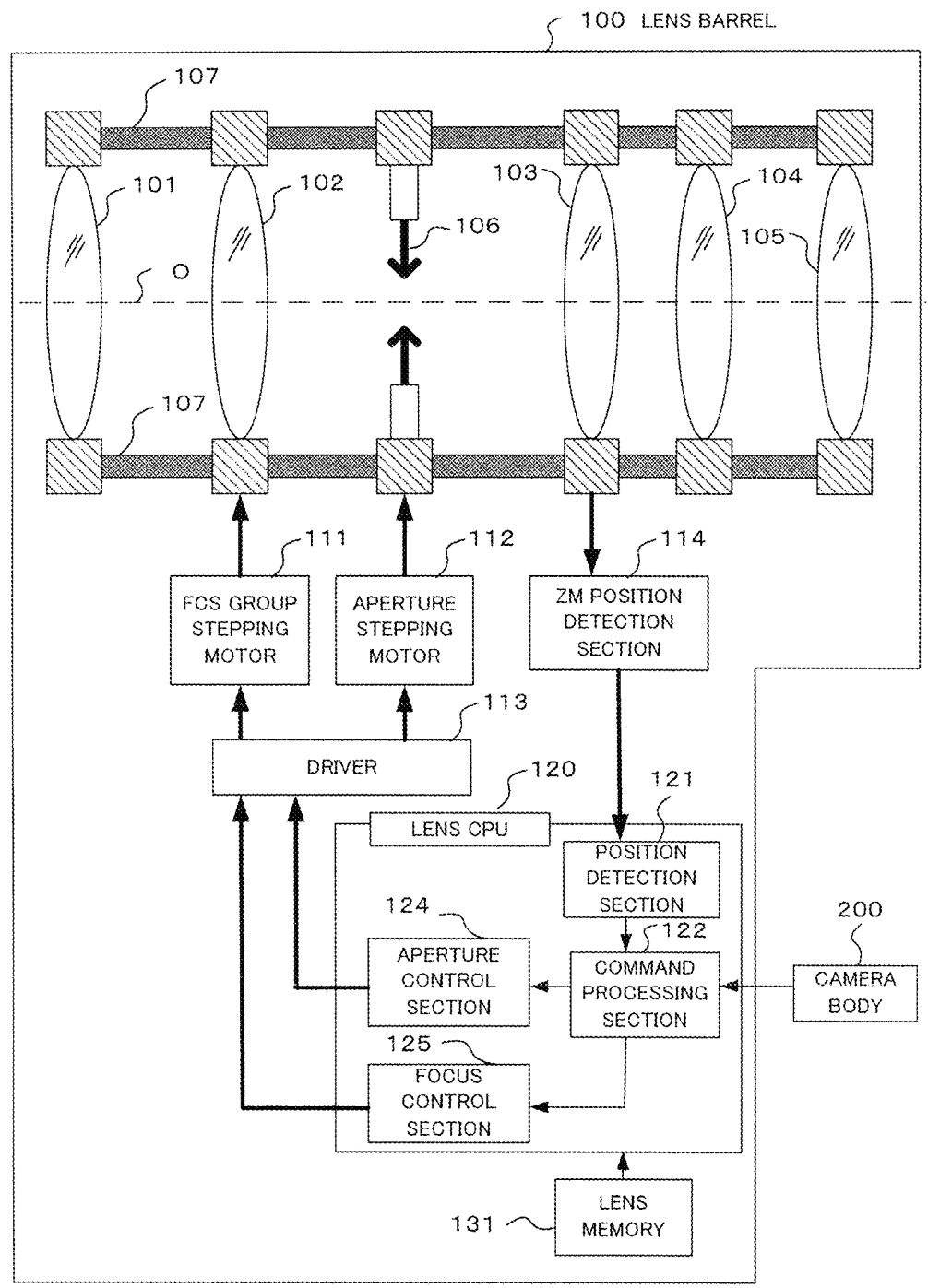
FIG. 1 is a block diagram showing the structure of a lens barrel of a camera of one embodiment of the present invention.

An example where a digital camera is adopted as one embodiment of the present invention will be described in the following. This digital camera comprises a lens barrel having a photographing lens, an aperture mechanism for opening and closing the aperture, and an aperture drive section for driving the aperture drive mechanism, and a camera body constructed to be attachable to or integral with this lens barrel.

This digital camera also has an imaging section. A subject image is converted to image data by this imaging section, and the subject image is subjected to through image display on a display section arranged on the rear surface of the camera body based on this converted image data. A photographer determines composition and photo opportunity by looking at the through image display. At the time of operation of a release button or movie button, image data for a still picture or a movie is stored in a storage medium. Image data that has been stored in the storage medium can be played back and displayed on the display section if playback mode is selected.

Also, an aperture mechanism is provided inside the lens barrel, and controls opening diameter of the aperture based on aperture value instructed from the camera body. There are lens units that have first control and second control as aperture motor control when aperture value has been changed. If first control is executed, the drive speed of the aperture motor is controlled so as to give a constant change in amount of light. If, however, the second control is executed, the drive speed of the aperture motor becomes constant. The digital camera of this embodiment has a movie recording mode and still picture recording mode, and, as will be described later, first control is executed at the time of movie shooting and second control is executed at the time of still picture shooting.

When driving the aperture in minimum drive units, in the case of an aperture mechanism and aperture drive mechanism that have fixed AV value change amount, it is possible to consider rate of change of AV value to be constant if the aperture is driven at a constant speed in minimum drive units (fixed time intervals). Accordingly, in this case exposure changes naturally with change in aperture. However, when driving the aperture with minimum drive units, in the case of an aperture mechanism and aperture drive mechanism with which AV value change amount is not constant but changes in accordance with aperture (or rotational position of the aperture motor), if the aperture is driven at a constant speed in minimum drive units (fixed time intervals) rate of change of the AV value will change in accordance with aperture value (or rotational position of the aperture motor). In this type of case, exposure is changed unnaturally with change in aperture. With this application, control is performed so that rate of change of AV value becomes constant (amount of light passing through the aperture changes at a constant rate) even if there is this type of aperture mechanism and aperture drive mechanism, and control is performed so that exposure changes naturally with change in aperture.

Figure 2:
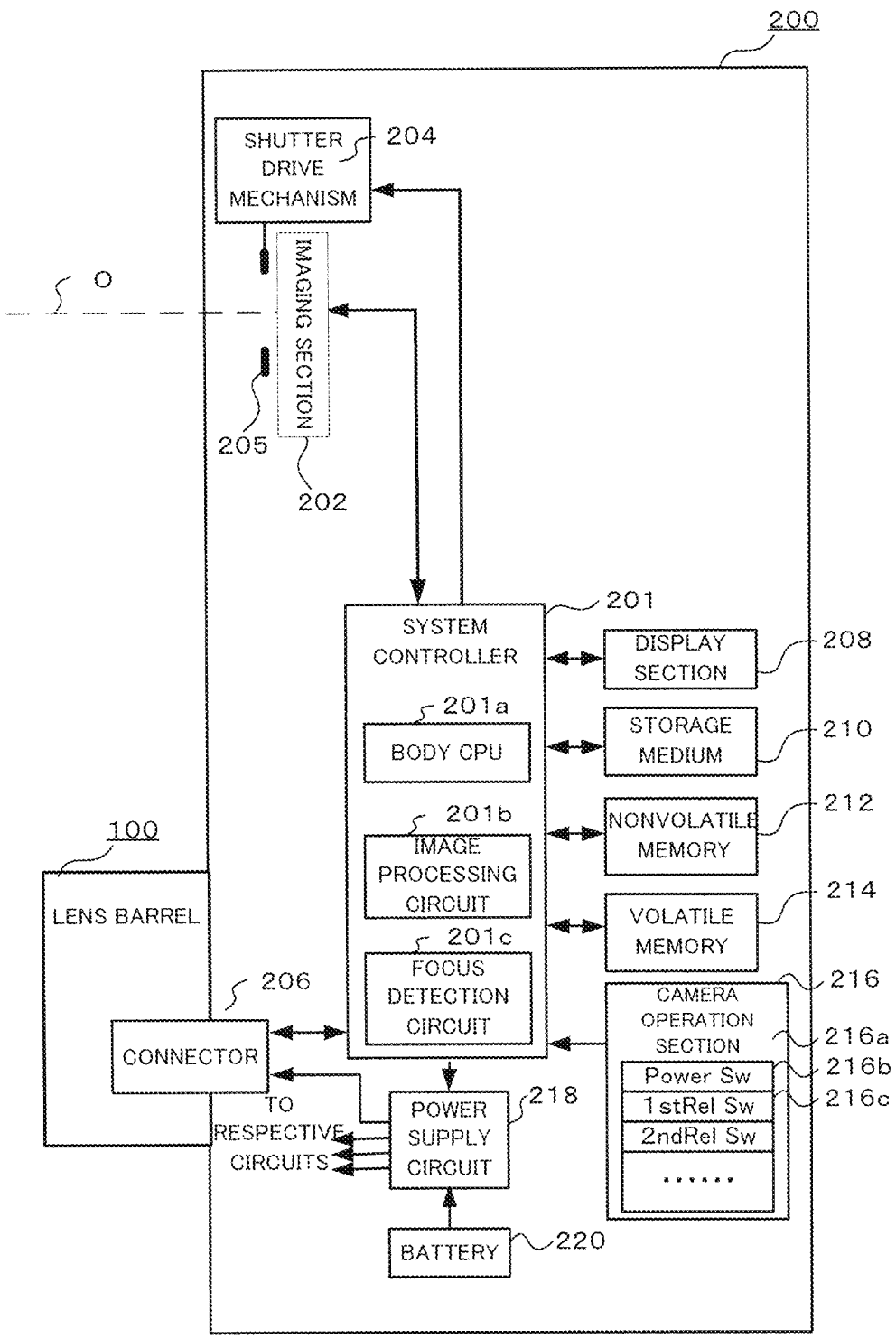
FIG. 2 is a block diagram showing the structure of a camera body of a camera of one embodiment of the present invention.

FIG. 1 is a block diagram showing the structure of a lens barrel 100 of a camera of one embodiment of the present invention, and FIG. 2 is a block diagram showing the structure of a camera body 200 to which the lens barrel 100 is attached. With this embodiment, the lens barrel 100 is an interchangeable lens, but the lens barrel 100 may also of a type that is fixed to the camera body 200.

An optical system including a zoom lens group is arranged within the lens barrel 100, as well as an aperture for controlling subject light amount that passes through the optical system. Specifically, photographing lenses 101-105 for forming a subject image, and an aperture 106 are held within the lens barrel 100 by a frame 107. Of these, a focus lens group 102 is for focus adjustment, and is capable of moving in the direction of the optical axis O. Also, a zoom lens group 103 is for focal length adjustment, and is capable of moving in the direction of the optical axis O. Other lens groups 101, 104 and 105 are fixed to the frame 107, or are capable of moving in the direction of the optical axis O.

An aperture 106 that has a variable opening diameter (opening amount) and restricts light flux that passes through the optical system is arranged between the focus lens group 102 and the zoom lens group 103. Naturally, the position of the aperture 106 may also be a position other than between the focus lens group 102 and the zoom lens group 103.

The focus lens group 102 is capable of being moved along the direction of the optical axis O by an FCS group stepping motor 111. Also, the aperture 106 is controlled between a state where the opening diameter is wide open and a minimum aperture state by an aperture stepping motor 112. Because a stepping motor is used, it is possible to set, as a reference, a point in time when a signal, that is output from a sensor (not illustrated) when the opening diameter of the aperture 106 is at a reference position, is detected, and detect opening diameter by counting a number of steps of the stepping motor from this point in time. It is obviously also possible to detect position of the focus lens group 102 and aperture value of the aperture 106 using other position detection means, such as a GMR (giant magneto resistance) sensor or photo interrupter etc. The aperture stepping motor 112 functions as an aperture drive section for driving the aperture drive mechanism.

A driver 113 is connected to the FCS group stepping motor 111 and the aperture stepping motor 112, and carries out drive control for the respective stepping motors. Aperture value of the aperture 106 and position of the focus lens are detected based on a number of pulses (pls) that have been applied to the stepping motor, from a reference position of the aperture 106 or the focus lens.

It should be noted that in this embodiment stepping motors have been adopted, but this is not limiting and other actuators may also be adopted, such as voice coil motors. In a case where voice coil motors or the like are used, detection sections for detecting position of the focus lens group 102 and aperture value of the aperture 106 are separately provided.

Also, the zoom lens group 103 is moved in the direction of the optical axis O in accordance with a manual turning operation of a zoom ring (not illustrated) that is provided on the periphery of the lens barrel 100 capable of being turned. It should be noted that a drive section (for example, a DC motor, stepping motor or voice coil motor etc.) for driving the zoom lens group 103 in the optical axis O direction may be provided, so as to carry out zooming in accordance with a zoom operation in the lens barrel 100 or the camera body 200.

A zoom (ZM) position detection section 114 detects position of the zoom lens group 103. This position detection may be, for example, detecting absolute position using an encoder for detecting position of the zoom lens group 103, or detecting absolute position by combining a photo interrupter PI (for absolute position detection) that provides output in accordance with movement of the zoom lens group 103 and a photo interrupter PI (for absolute position detection) that detects a reference position.

A lens CPU 120 comprises a CPU (Central Processing Unit) and peripheral circuits for the CPU, and carries out control of the lens barrel 100 in accordance with commands from the camera body 200 (instructions to the lens barrel 100) etc., in accordance with programs stored in a lens memory 131.

Inside the lens CPU 120 are a position detection section 121, a command processing section 122, an aperture control section 124, and a focus control section 125. Each of these sections may be handled by hardware within the lens CPU 120, but in this embodiment they are handled by software in accordance with a program.

The position detection section 121 is input with a detection result from a zoom position detection section 114, and outputs position of the zoom lens group 103. The command processing section 122 receives commands that have been transmitted from the camera body 200 and executes processing corresponding to the commands.

The aperture control section 124, when a command for driving the aperture 106 has been received from the camera body 200 by the command processing section 122, carries out drive control of the aperture 106 by driving the aperture stepping motor 112 by means of the driver 113 in accordance with this received command. In this drive control, opening amount of the aperture 106 is set in accordance with a relationship between position of the zoom lens group 103 and opening amount of the aperture 106 data stored in the lens memory 131, and position of the zoom lens group 103 that has been detected by the position detection section 121.

The focus control section 125, when a command for driving the focus lens group 102 has been received from the camera body 200 by the command processing section 122, carries out drive control of the focus lens group 102 by driving the FCS group stepping motor 111 by means of the driver 113 in accordance with this received command.

The lens memory 131 is connected to the lens CPU 120, and this lens memory 131 has an electrically rewritable memory such as flash ROM. The lens memory 131 stores the program described above, and, as was described previously, stores relationships between position of the zoom lens group 103 and opening amount of the aperture 106, and relationships between aperture value and amount of focus shift of the focus lens group 102.

The lens memory 131 also stores aperture sensitivity. Aperture sensitivity represents by how much aperture value changes when a single pulse is applied to the aperture stepping motor 112. The lens memory 131 functions as a memory for storing characteristics of the aperture drive mechanism. Aperture sensitivity will be described later using FIG. 16.

Figure 6:
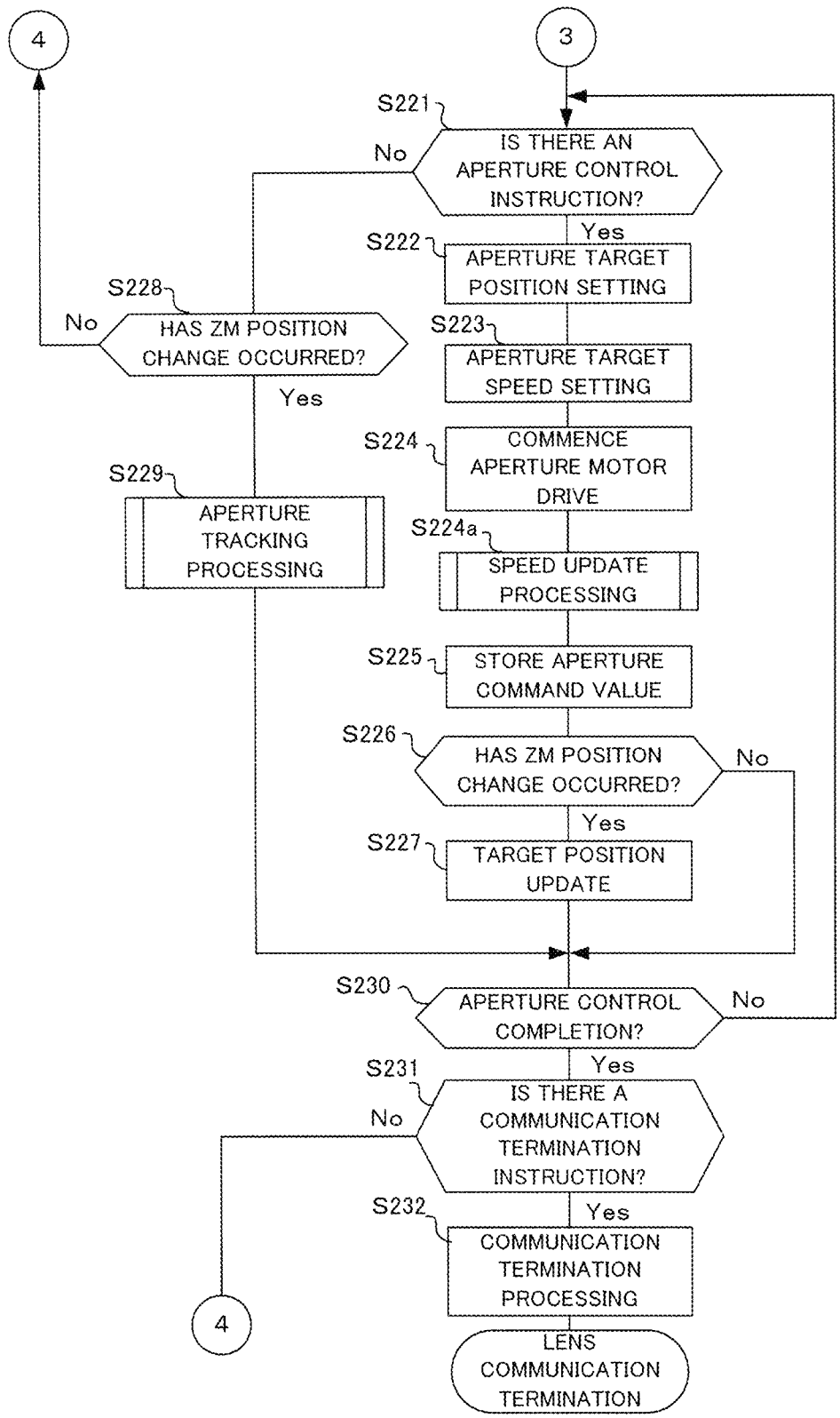
FIG. 6 is a flowchart showing operation of the lens barrel of one embodiment of the present invention.
Figure 9:
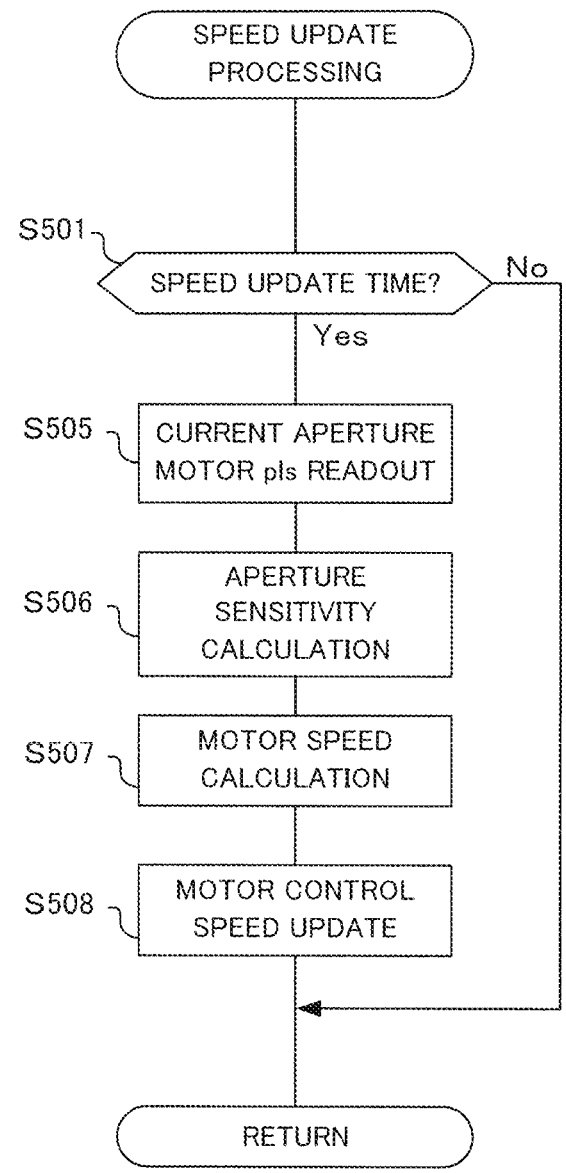
FIG. 9 is a flowchart showing operation of speed update processing of the lens barrel of one embodiment of the present invention.

The lens CPU 120 functions as an aperture control section for controlling the aperture drive section so that rate of change of light amount passing through the aperture as a result of opening and closing operations of the aperture becomes constant, based on characteristics of the aperture drive mechanism (refer to S224a in FIG. 6, and to FIG. 9). Also, this aperture control section reads out aperture sensitivity for the aperture drive mechanism corresponding to aperture value from the memory, and calculates aperture motor drive speed using the rate of change of light amount passing through the aperture and the aperture sensitivity (refer, for example, to S505-S507 in FIG. 9, and equations (3) and (5)).

Figure 10:
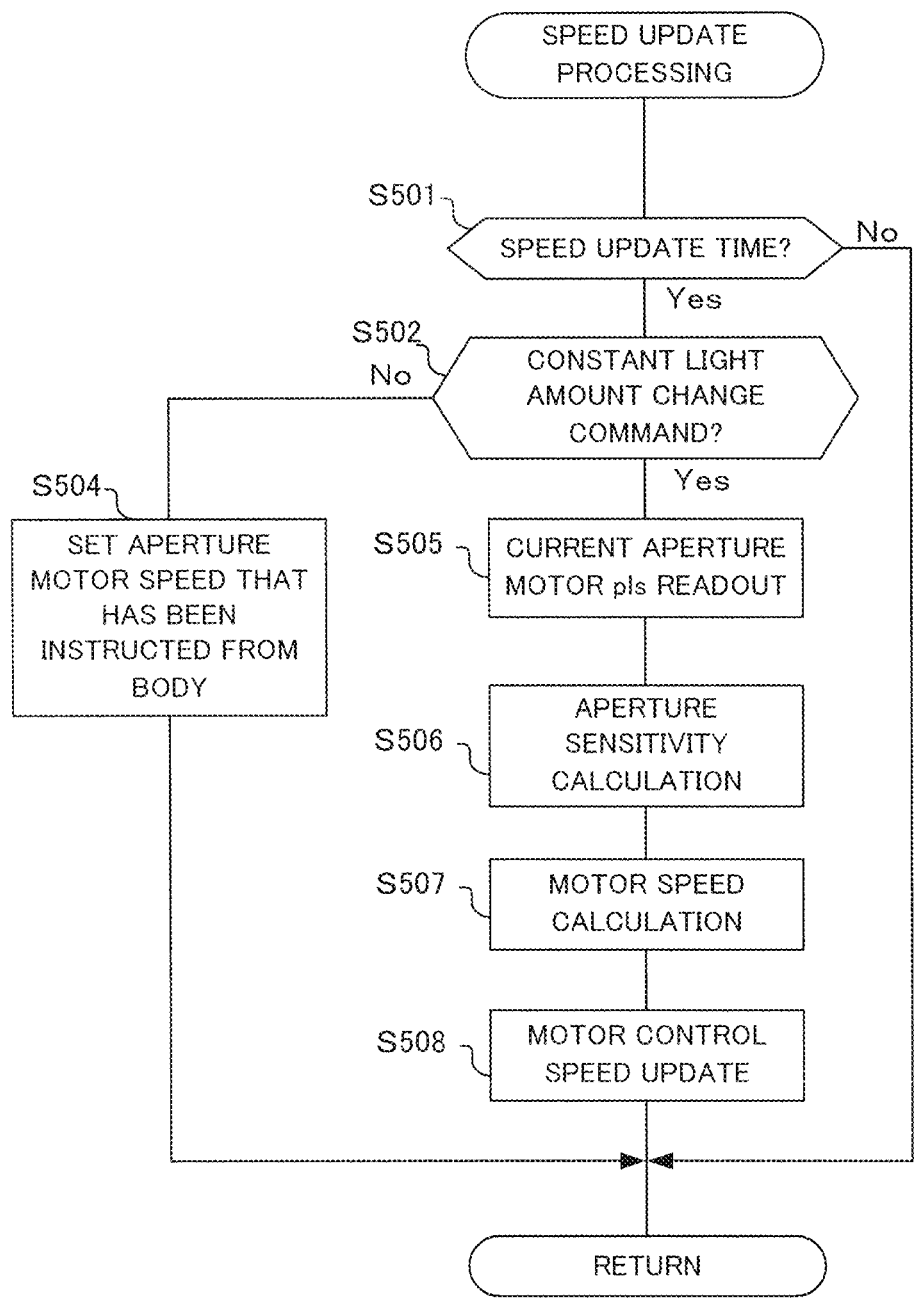
FIG. 10 is a flowchart showing operation of modified example 1 of speed update processing of the lens barrel of one embodiment of the present invention.
Figure 11:
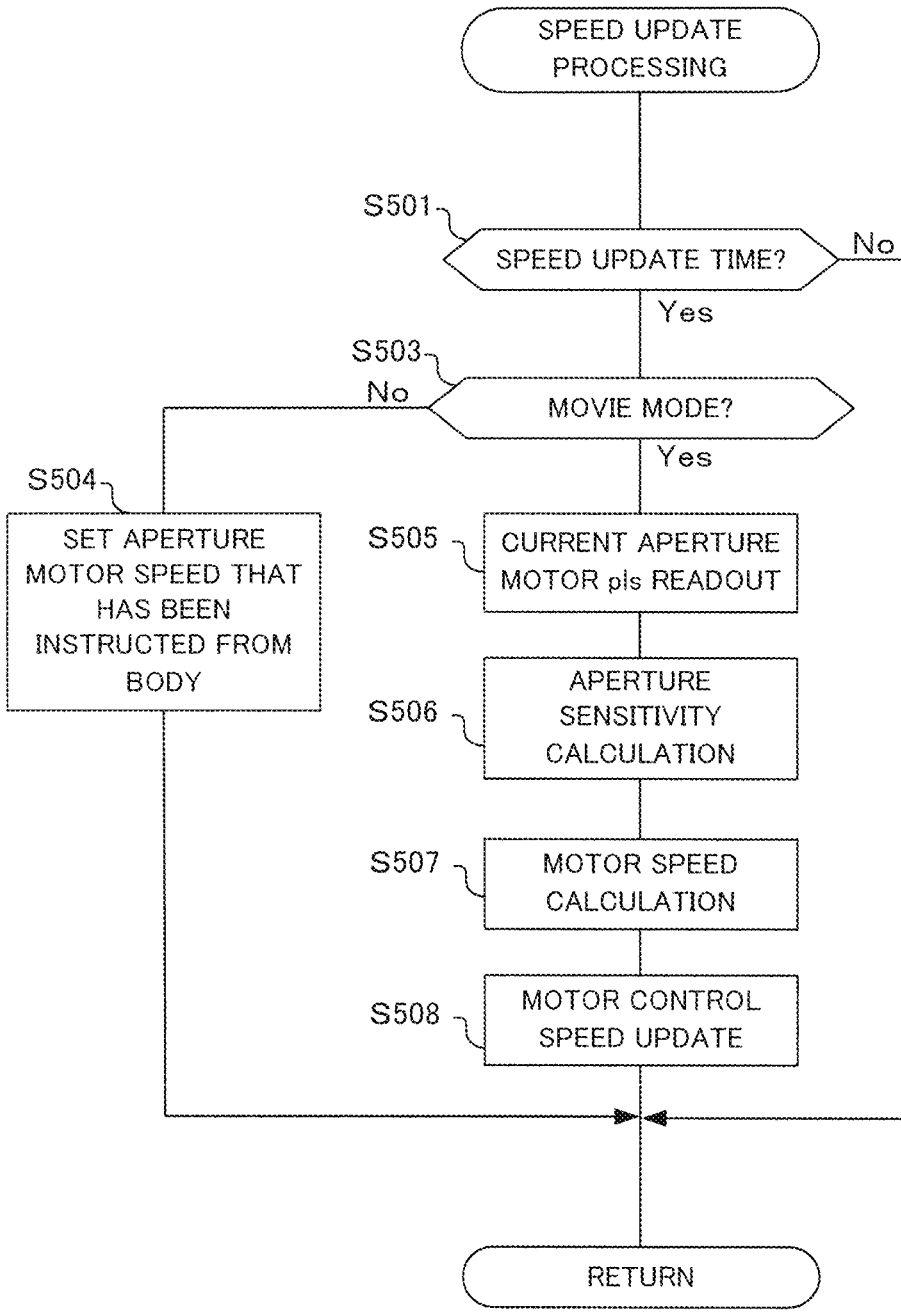
FIG. 11 is a flowchart showing operation of modified example 2 of speed update processing of the lens barrel of one embodiment of the present invention.

Also, this aperture control section, when constant light amount rate of change has been instructed, or when movie mode has been instructed, controls the aperture drive section so that rate of change of light amount passing through the aperture becomes constant (refer, for example, to S502 in FIG. 10 and S503 in FIG. 11). This aperture control section also carries out speed update in accordance with image data read out time, or in accordance with a specified amount of movement of the photographing lens (refer, for example, to S501 in FIG. 9).

The lens CPU 120 also functions as an aperture control section for, based on the characteristics of the aperture drive mechanism, executing first control to control the aperture drive section so that rate of change of light amount passing through the aperture as a result of opening and closing operations of the aperture becomes constant, or executing second control to control the aperture drive section independently of the characteristics of the aperture drive mechanism (refer, for example, to S502 in FIG. 10, and S503 in FIG. 11).

Also, in a case where the aperture control instruction section (in this embodiment, a function of the body CPU 201a) has instructed to the aperture control section using a first aperture instruction, the aperture control section executes first control (refer, for example, to FIG. 10 or S505-S508 in FIG. 11). This aperture control instruction section, in the case of movie recording mode, instructs to the aperture control section using a first aperture instruction (refer, for example, to S503 and S505-S508 in FIG. 11). This aperture control instruction section, in the case of still picture recording mode, instructs to the aperture control section using a second aperture instruction, and the aperture control section executes second control (refer, for example, to S503 and S504 in FIG. 11).

The lens barrel 100 and the camera body 200 are electrically connected by a connector 206. Specifically, communication is possible between the lens CPU 120 and the body CPU 201a within the system controller 201 by means of the connector 206, and power is supplied from the power supply circuit 218 to the lens barrel 100.

A shutter 205 and an imaging section 202 are also arranged within the camera body, on the optical axis O of the optical system within the lens barrel 100. The shutter 205, under control of a shutter drive mechanism, allows subject light flux to pass for a time determined by shutter speed, based on control signals from the system controller 201. Also, at the time of through image display, the shutter is in a wide-open state.

The imaging section 202 is provided with an image sensor and an imaging control circuit, converts a subject image that has been formed by the optical system within the lens barrel 100 to photoelectric conversion, and outputs image data to the system controller 201. The imaging section 202 carries out control such as electrical charge storage and readout of the image sensor, based on control signals from the system controller 201. The imaging section 202 also has an electronic shutter function, and can control exposure time electronically.

A display section 208, storage medium 210, non-volatile memory 212, volatile memory 214, camera operation section 216, and power supply circuit 218 are also connected to the system controller 201.

The display section 208 has a display monitor arranged on the rear surface or the like of the camera body 200, and/or an electronic viewfinder for observation by means of an eyepiece built into the camera body 200, and carries out through image display based on image data from the imaging section 202. Image data that has been stored in the storage medium 210 is also read out and playback display of already recorded images is carried out. Screen display for setting of various modes and adjustments, such as menu screens, is also carried out.

The storage medium 210 is an electrically rewritable nonvolatile memory such as a removable memory card. After the photographer performs full pressing of the release button and image processing for image recording has been carried out on image data that was acquired when an instruction of this embodiment was carried out, the storage medium 210 records this image data that has been subjected to image processing.

The non-volatile memory 212 is an electrically rewritable memory such as flash ROM. A program used as overall camera control in the body CPU 201a is stored in the non-volatile memory 212, and adjustment values of the camera system are also stored.

A volatile memory 214 is an electrically rewritable memory such as DRAM or SDRAM. The volatile memory 214 temporarily stores image data (that has been image processed by the image processing circuit 201b) from the imaging section 202. The volatile memory 214 is also used as working memory for the body CPU 201a.

The camera operation section 216 includes operation members for the photographer to carry out various instructions to the camera, and operating states of these operation members are detected and the results of detection output to the system controller 201. The system controller 201 carries out control of the camera system based on detection signals from the camera operation section 216.

As operation members within the camera operation section 216, there are a power switch 216a, a 1st release switch 216b, a 2nd release switch 216c, a shooting mode dial, an aperture preview button, and a movie record button etc. The power switch 216a is a switch for commencing operation of the camera system. The 1st release switch 216b is a switch that is turned on if the release button is in a half pressed state, while the 2nd release switch 216c was a switch that is turned on if the release button is in a fully pressed state.

The power supply circuit 218 is connected to a battery 220, and stabilizes a power supply voltage from the battery 220 to a supply voltage for supply to each section of the camera system.

Within the system controller 201 are the body CPU 201a, image processing circuit 201b and focus detection circuit 201c. The image processing circuit 201b applies various image processing for through image display and image recording to image data from the imaging section 202.

The focus detection circuit 201c uses image data from the imaging section 202 to extract high frequency components of the image data and calculate a contrast value. The focus lens group 102 within the lens barrel 100 is moved to a focus position so that this contrast value becomes a peak value.

The body CPU 201a controls each section of the entire camera system in accordance with a program stored in the non-volatile memory 212. The body CPU 201a is capable of communication with the lens CPU 120 within the lens barrel 100, and each section within the lens barrel 100 is controlled by means of the lens CPU 120.

The body CPU 201a also functions as an aperture control instruction section for instructing to the aperture control section, using a first aperture instruction for designating rate of change of light amount passing through the aperture, or using a second aperture instruction for not designating rate of change of light amount passing through the aperture (refer, for example, to S502 in FIG. 10 and S503 in FIG. 11).

Next, operation of the camera body 200 of this embodiment will be described using the flowcharts shown in FIG. 3 and FIG. 4. This flow is executed by the body CPU 201a provided within the camera body 200 in accordance with a program that has been stored in the non-volatile memory 212.

Figure 3:
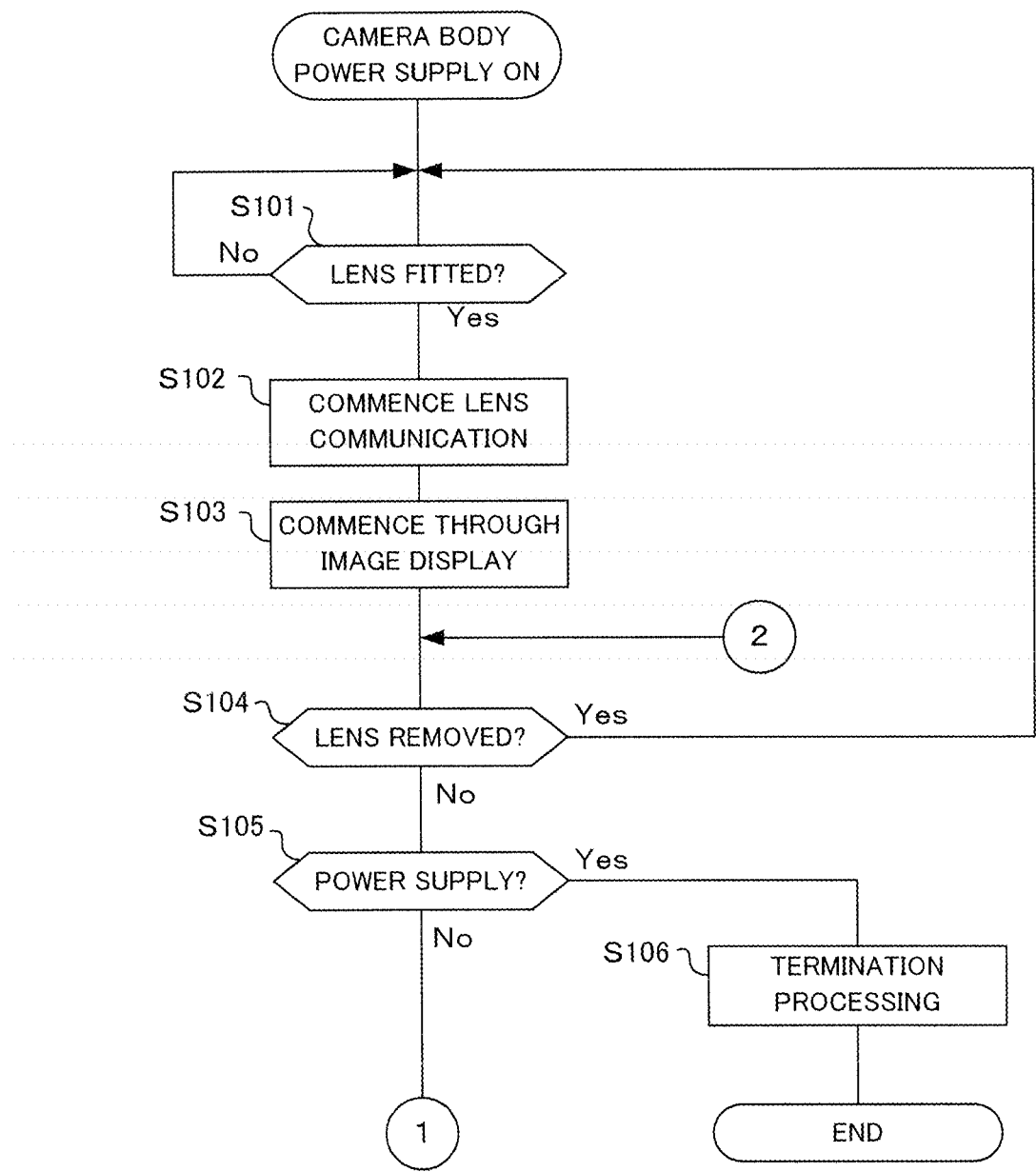
FIG. 3 is a flowchart showing operation of the camera body of the one embodiment of the present invention.
Figure 4:
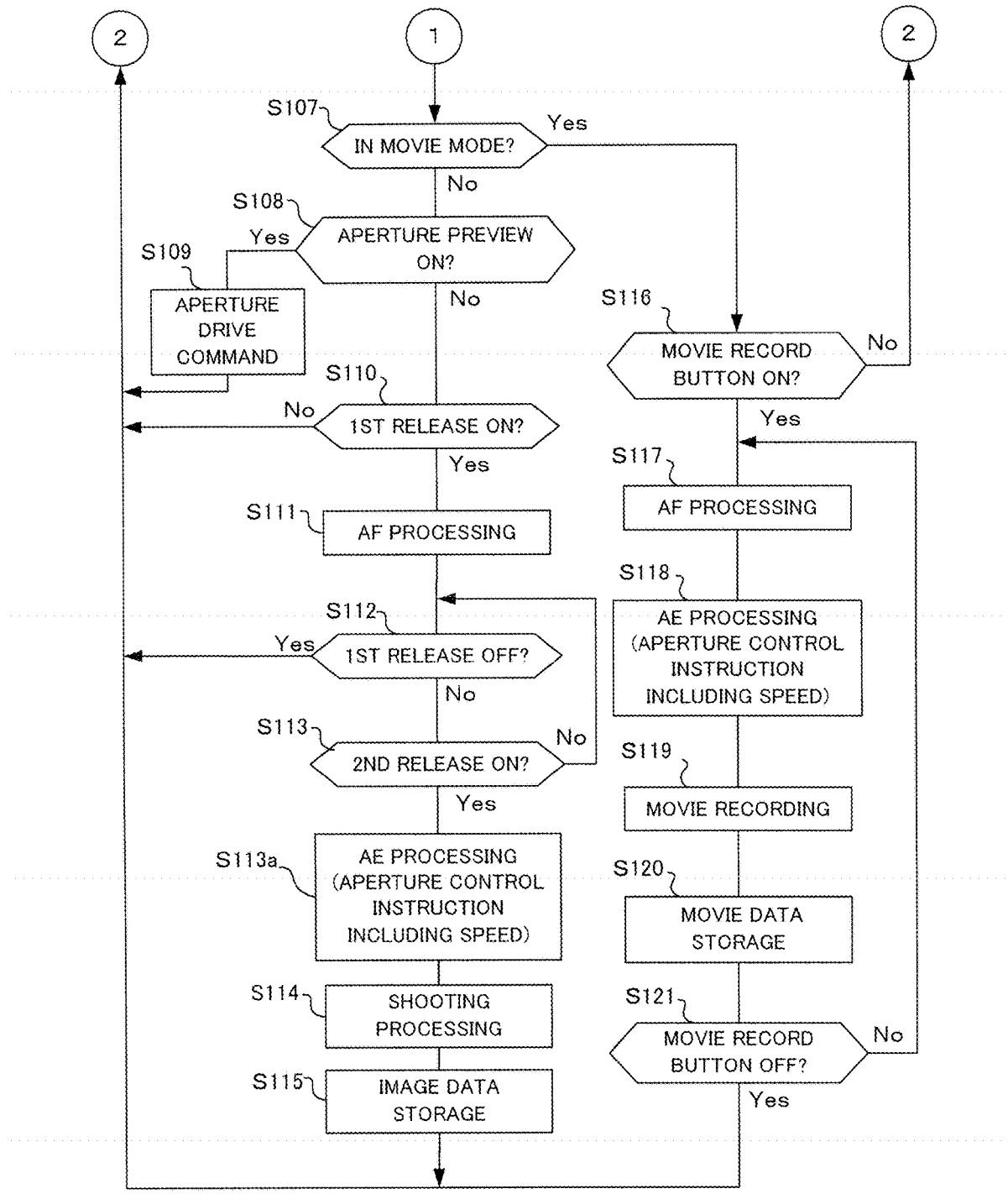
FIG. 4 is a flowchart showing operation of the camera body of the one embodiment of the present invention.

If the power switch 216a is turned on and power supply to the camera body 200 is turned on, the flow shown in FIG. 3 and FIG. 4 starts. First it is determined whether or not a lens is attached (S101). Here, attachment to the lens barrel 100 is determined based on an attachment detection switch (not shown) or the like provided on the camera body 200. It should be noted that besides a switch, determination may be carried out depending on whether the communication is possible between the body CPU 201a within the camera body 200 and the lens CPU 120 of the lens barrel 100.

If the result of determination in step S101 is that a lens is attached, next lens communication is commenced (S102). Here, communication between the body CPU 201a within the camera body 200 and the lens CPU 120 within the lens barrel 100 is commenced by means of a communication section, using a known method.

Next, through image display is commenced (S103). Here, display of a through image (also called a live view image) on the display section 208 is commenced based on image data from the image sensor within the imaging section 202 provided within the camera body 200. After that, image data is read out and a through image displayed every time an exposure time corresponding to frame rate elapses.

Once through image display has commenced, it is next determined whether or not the lens has been removed (S104). Here it is determined whether or not the lens barrel 100 has been removed from the camera body 200 based on the state of the lens attachment switch. If the result of this determination is that the lens has been removed, processing returns to Step S101.

On the other hand, if the result of determination in step S104 is that the lens has not been removed (namely that the lens is still attached), it is next determined whether or not the power supply is off (S105). Here, determination is based on operating state of an operation member such as the power supply switch provided on the camera body 200. If the result of this determination is that the power supply is off, termination processing is carried out (S106) and this flow is terminated.

On the other hand, if the result of determination in step S105 is that the power supply is not off (namely that the power supply is still on), it is next determined whether or not the camera is in movie mode (S107). For example, it is determined whether or not the photographer has set movie mode by switching the shooting mode dial to movie mode, or the like.

If the result of determination in step S107 is that movie mode is not being performed, it is determined whether or not aperture preview is on (S108). Normally, during through image display the aperture 106 is in a wide-open state, but in this state it is not actually possible to confirm the subject depth of field for when the aperture is stopped down. With this embodiment, therefore, an operation member for handling aperture preview is provided, such as an aperture preview button, and in the event that this operation member has been operated aperture preview is executed to set the aperture 106 to an aperture value that has be set manually or automatically.

If the result of determination in step S108 is that aperture preview is on, aperture drive command is carried out (S109). Here, the body CPU 201*a* within the camera body 200 outputs a command for aperture drive command to the lens CPU 120 within the lens barrel 100. Once the lens CPU 120 receives this command preview is executed in steps S221-S225 (refer to FIG. 6). Once the aperture drive command has been executed processing returns to step S104.

If the result of determination in step S108 was not that the aperture preview is on, it is next determined whether or not the 1st release switch is on (S110). If the photographer has determined composition to a certain extent while observing the through image, a shooting preparation state is set and a half press of the release button is carried out. The 1st release switch 216*b* is turned on in response to a half press operation of the release button. In this step it is determined whether or not the 1st release switch 216*b* is on. If the result of this determination is not that the first release 216*b* is on, namely that the release button has not been pressed down half way, step S104 is returned to.

If the result of determination in step S110 is that the 1st release switch is on, namely that a half press of the release button has been performed, AF processing is carried out (S111). Here, focus adjustment is carried out using contrast AF or the like based on image data from the imaging section 202 within the camera body 200. At this time, the body CPU 201*a* within the camera body 200 carries out focus adjustment by outputting commands for driving the focus lens group 102 to the lens CPU 120 within the lens barrel 100.

It should be noted that specifically, AF processing involves execution of scan drive for detecting focus lens position at which contrast becomes a peak, called hill climbing AF, absolute drive to achieve focus by driving the focus lens to this peak position, and wobbling drive for moving the focus lens in the optical axis direction at a given amplitude and detecting contrast at an endpoint, etc.

Once AF processing has been carried out, it is next determined whether or not the 1st release switch is off (S112). Here, it is determined whether or not the photographer has taken their finger off the release button after having pressed down the release button halfway in step S110. If the result of this determination is that the 1st release switch 216*b* is off, processing returns to step S104.

On the other hand, if the result of determination in step S112 is that the 1st release switch is not off, namely that the half press of the release button is continuing, it is next determined whether or not the 2nd release switch is on (S113). In a case where the photographer has focused on a subject by pressing the release button half way, determined composition while observing the through image, and performed shooting, the release button is then pressed down fully (a state where the release button is pressed down further from the half pressed state). The 2nd release switch 216*c* is turned on in response to a full press operation of the release button. In this step it is determined whether or not the 2nd release switch 216*c* is on. If the result of this determination is that the second release is not on, namely that the full press has not been performed but the release button is still pressed down half way, processing returns to step S112.

If the result of determination in step S113 is that the 2nd release switch has been turned on, AE processing is carried out (S113*a*). Here, brightness information is calculated based on image data from the image sensor that was acquired immediately before the 2nd release switch was turned on, and based on this brightness information aperture value of the aperture 106, shutter speed value of the shutter 205, and ISO sensitivity of the image sensor are calculated so as to achieve correct exposure. In order to control the aperture 106, the body CPU 201*a* outputs an aperture control command to the lens CPU 120. The aperture control command includes aperture value and aperture drive speed for achieving correct exposure.

Once AE processing is being carried out, next shooting processing is carried out (S114). At this time, the aperture 106 at the interchangeable lens 100 side is subjected to aperture drive in accordance with the aperture control command. Also, the camera body CPU 201*a* controls exposure time using the shutter 205 to achieve correct exposure. Then, after completion of exposure, image data for a still picture is acquired from the imaging section 202, and the image processing circuit 201*b* applies image processing for storage to the image data. The aperture control at the interchangeable lens 100 side will be described later using FIG. 6, FIG. 8 and FIG. 9.

Once shooting processing has been carried out, image data is stored (S115). Here, image data that has been subjected to image processing for storage in the shooting processing of step S114 is stored in storage medium 210 within the camera body. Once image data storage has been carried out processing returns to step S104.

On the other hand, if the result of determination in step S107 is that movie mode is in progress, it is next determined whether or not the movie record button is on (S116). The photographer observes a through image, and to cause movie shooting to commence the photographer operates the movie record button, and so in this step determination is based on the operating state of the movie record button. If the result of this determination is that the movie record button is not being operated, processing returns to step S104.

If the result of determination in step S116 is that the movie record button is on, AF processing is carried out (S117). AF processing involves carrying out focus adjustment using contrast AF or the like based on image data from the image sensor within the camera body 200. At this time, the body CPU within the camera body 200 carries out focus adjustment by outputting commands for driving the focus lens group 102 to the lens CPU 120 within the lens barrel 100. With the AF processing of step S111, so-called single AF (where a focus adjustment operation is terminated when focusing has been performed once) may also be carried out, but in step S117 AF processing is carried out using so-called continuous AF (automatic focus adjustment so as to always maintain a focus state, where automatic focus adjustment is carried out again if focus is lost after focusing).

Once AF processing has been carried out, next AE processing is carried out (S118). Here, if image data for a single frame has been acquired, brightness information is calculated based on this image data, and aperture value of the aperture 106, electronic shutter speed and ISO sensitivity of the image sensor etc. are calculated based on this brightness information so as to achieve correct exposure. In order to control the aperture 106, the body CPU 201*a* outputs an aperture control command to the lens CPU 120. The aperture control command includes aperture value and aperture drive speed for achieving correct exposure.

Once AE processing has been carried out, movie recording is carried out (S119) and recorded image data storage is carried out (S120). Here, image data for a movie is acquired from the image sensor, this image data is subjected to image processing for movie storage, and this processed image data is stored in the storage medium 210 within the camera body.

Once movie data storage has been carried out, it is next determined whether or not the movie record button is off (S121). Here it is determined whether the movie record button that was turned on in step S116 has been turned off, namely, whether or not pressing of the movie record button has been released. With this embodiment, recording of a movie is carried out while the movie record button is being pressed, but this is not limiting and it is also possible, for example, to commence recording of a movie when the movie record button is pressed, then continue the recording of the movie even if a finger is taken off the movie record button, and complete movie recording when the movie record button is pressed again.

If the result of determination in step S121 is that the movie record button is not off, namely that the movie record button is still operated, processing returns to S117 and movie recording continues. On the other hand, if the result of determination in step S121 is that the movie record button is off, namely that operation of the movie record button has been released, movie recording is terminated and processing returns to S104.

Next, operation of the lens barrel 100 of this embodiment will be described using the flowcharts shown in FIG. 5 and FIG. 6. This flow (the same also applies to FIG. 7 to FIG. 11 which will be described later) is executed by the lens CPU 120 that is provided within the lens barrel 100, in accordance with a program that has been stored in the memory 131 within the lens barrel 100.

Figure 5:
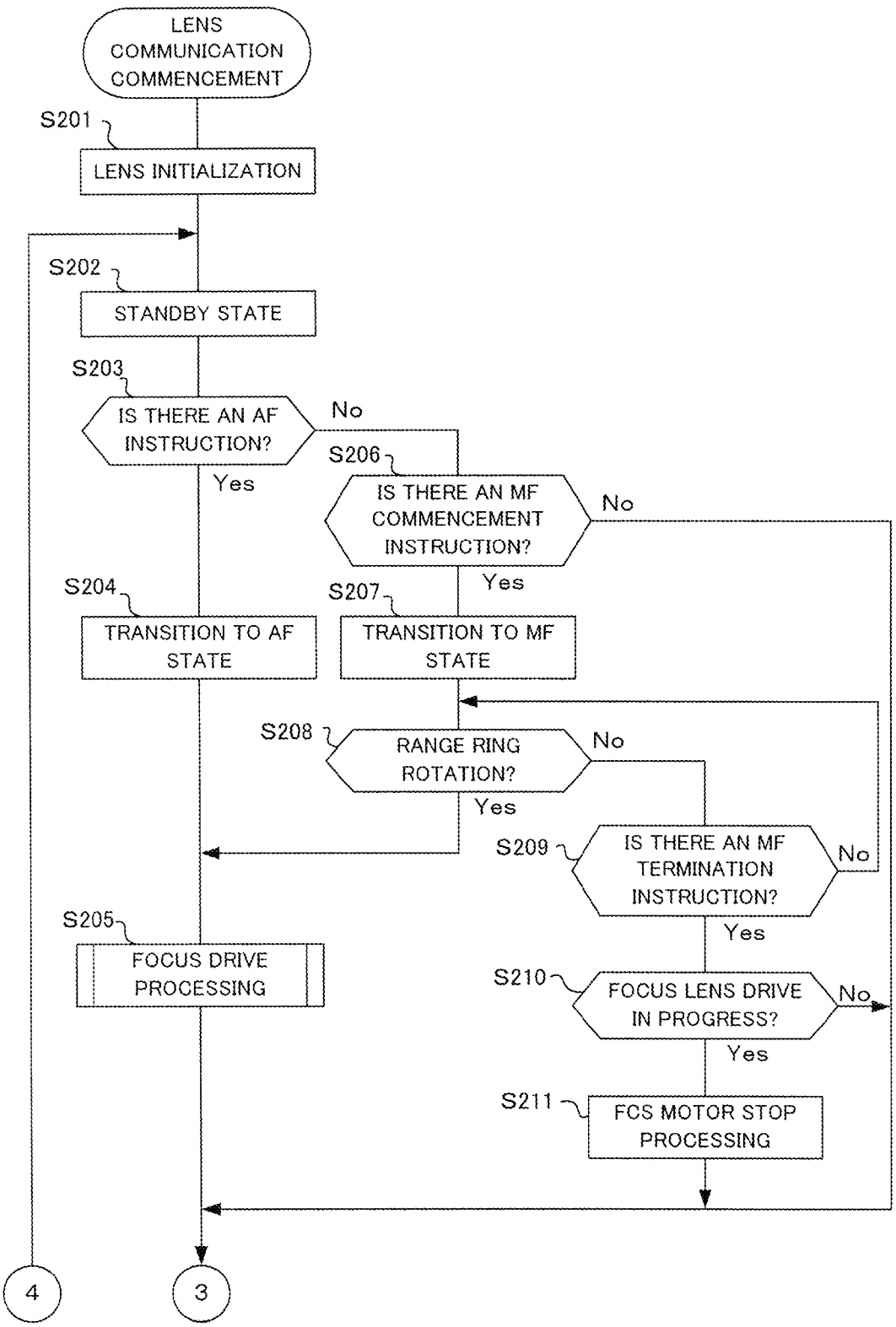
FIG. 5 is a flowchart showing operation of a lens barrel of one embodiment of the present invention.

If the power supply within the camera body 100 is turned on, and as a result the power supply of the lens barrel 100 is turned on, the flow shown in FIG. 5 FIG. 6 and is started. First, lens initialization is carried out (S201). Here mechanical initialization is carried out so that mechanical positions of the photographing lenses 101-105 and the aperture 106 etc. are set to initial positions, and electrical initialization is carried out for various flags etc.

If lens initialization is being carried out, a standby state is then entered (S202). If the lens barrel 100 does not receive commands instructing operation from the camera body 200, or if there is no operation of operation members provided on the lens barrel 100, such as the zoom ring or range ring, operation is not commenced. In this step, receipt of commands from the camera body 200 is awaited, and processing advances to step S203 if a command is received or on operation member is operated.

If the standby state is escaped from, it is determined whether or not there is on AF instruction (S203). In the camera body 100, if AF processing is carried out insteps S111 and S117, a command for driving the focus lens group 102 is transmitted to the lens CPU 120 in accordance with a focus detection result at the body side. In this step determination is based on whether a command for this AF instruction has been received.

If the result of determination in step S203 is that there is AF instruction, there is a transition to an AF state (S204), and focus drive is executed (S205). Here, the command processing section 122 transitions to the AF state, the focus control section 125 is moved towards a target position in accordance with instruction from the camera body 200, and drive control of the FCS group stepping motor 111 is carried out at a target speed. Detailed operation of the focus drive processing of step S205 will be described later using FIG. 7.

If the result of determination in step S203 is that there is not an AF instruction, it is next determined whether or not there is an MF start instruction (S206). There are two types of focusing for the lens barrel 100, namely AF (automatic focus adjustment) and MF (manual focus adjustment), both of which can be set at the camera body 200 side, and in this step determination as to whether or not MF mode has been set at the camera body 200 side is made based on a command from the camera body side.

If the result of determination in step S206 is that there is an MF start instruction, there is a transition to the MF state (S207), and it is determined whether or not the range ring (not shown) has been rotated (S208). Here the command processing section 122 transitions to the MF state, and MF (manual focus adjustment) is executed in accordance with rotation direction and rotation amount of the range ring that is rotatably provided on the periphery of the lens barrel 100. If the result of determination in step S208 is that the range ring is being rotated, processing advances to step S205 and manual focus adjustment is carried out in accordance with the detected rotation direction and rotation amount.

If the result of determination in step S208 is that the range ring is not being rotated, it is next determined whether or not there is an MF termination instruction (S209). Here, determination as to whether or not setting of the MF mode has been released at the camera body side is based on a command from the camera body. If the result of this determination is that there is an MF termination instruction, processing returns to step S208 and MF mode continues.

If the result of determination in step S209 is that there is an MF termination instruction it is next determined whether or not focus lens drive is in progress (S210). If the range ring is operated in step S208, the FCS group stepping motor 111 drives the focus lens group 102, but drive of the focus lens group 102 is delayed with respect to movement of the range ring. This means that even in the event that there is an MF termination instruction, there may be situations where drive of the focus lens group 102 is not terminated.

If the result of determination in step S210 is that the focus lens is not being driven, stop processing for the FCS group stepping motor 111 is carried out (S211).

If focus drive processing has been carried out in step S205, or if the result of determination in step S206 is that there is not MF start instruction, or if the result of determination in step S210 is that the focus lens is not being driven, or if stop processing for the FCS motor is carried out in step S211, it is next determined whether or not there is an aperture control instruction (S221). The camera body 200 outputs a command for aperture control instruction to the lens CPU 120 at the time of an aperture drive command at the time of the aperture preview of step S109, at the time of the shooting processing of step S114, at the time of AE processing at the time of the movie recording of step S118 etc. In this step S221, it is determined whether or not a command for this aperture control instruction has been transmitted.

If the result of determination in step S221 is that there is aperture control instruction, aperture target position is set (S222), aperture target speed is set (S223), and aperture motor drive is commenced (S224). In the event that a command for aperture control instruction is output to the lens CPU 120, the camera body 200 transmits an aperture control command including aperture value and aperture drive speed at the time of aperture drive etc. for attaining correct exposure. Aperture target position is therefore set by calculating a number of drive steps in order to reach the received aperture value from the current aperture value, based on aperture value for attaining correct exposure, current focal length, and information storing a relationship between position of the zoom lens group 103 and opening amount of the aperture 106 that is stored in the lens memory 131. Aperture target speed for when driving towards this set target position is then set. If aperture target position and aperture target speed have been set, aperture drive control for the aperture 106 is commenced using the aperture motor (aperture stepping motor 112).

Once aperture motor drive has been commenced, speed update processing is executed (S224a). Here, if a speed update time is reached, the current aperture motor pulse (pls) is read out, aperture sensitivity is calculated based on this aperture value, motor speed is calculated using this aperture sensitivity and a drive speed that was transmitted from the camera body in step S113a or S118, and control speed of the motor is updated in accordance with the calculated motor speed so that light amount changes constantly at the received drive speed. Detailed operation of this speed update processing will be described later using FIG. 9.

Once drive of the aperture motor has been commenced, next an aperture command value is stored (S225). Here, an aperture command value that is within a command for aperture control instruction that has been transmitted from the camera body 200 is stored in the lens memory 131 or in memory within the lens CPU 120. The reason for this is that before aperture control has terminated there may be situations where the photographer carries out a zoom operation, and control of opening diameter of the aperture 106 so as to achieve the aperture value that has been instructed from the camera body 200 is also carried out in this case (refer to steps S226 and S227).

If an aperture command value has been stored, it is next determined whether or not a zoom (ZM) position change has occurred (S226). Here it is determined whether or not the photographer has performed a turning operation of the zoom ring (or zoom operation member at the camera body side), and the focal length has changed. Occurrence of a focal length change may be determined based on, for example, temporal change in focal length that has been detected by the zoom position detection section 114.

If the result of determination in step S226 is that a zoom position change has occurred, target position update is carried out (S227). If the focal length is changed, then in order to achieve the aperture value that has been instructed from the camera body 200, opening diameter of the aperture 106 must be changed. In this step, the aperture target position that was set in step S222 is changed so as to attain the aperture value that was instructed from the camera body 200.

If the result of determination in step S221 is that there is not an aperture control instruction, it is next determined whether or not a zoom (ZM) position change has occurred (S228). As was described previously, if the zoom ring provided on the lens barrel 100 or the like is operated, the focal length of the optical system is changed. In this step, whether or not a change in zoom position has occurred is determined based on, for example, temporal change in focal length that has been detected by the zoom position detection section 114. If the result of this determination is that change to zoom position has not occurred, processing returns to step S202.

If the result of determination in step S228 is that a change to zoom position has occurred, next aperture tracking processing is executed (S229). Here, control of opening amount (opening diameter) of the aperture 106 is carried out so that aperture value being instructed from the camera body 200 is maintained even if the focal length is changed due to a zoom operation. Detailed operation of this aperture tracking processing will be described later using FIG. 8.

If the aperture tracking processing of step S229 has been carried out, or if the result of determination in step S226 was that a zoom position change has not occurred, or if target position update has been carried out in step S227, it is next determined whether or not there is aperture control completion (S230). Aperture control completion is determined when the aperture target position has been reached. If the result of this determination is not aperture control completion processing returns to step S221, and aperture control continues On the other hand, if the result of determination in step S230 is aperture control completion, it is determined whether or not there is a communication completion instruction (S231). At the camera body 200 side, in the event that communication between the camera body 200 and the lens barrel 100 is terminated due to the power supply being turned off etc., a communication termination command is transmitted to the lens barrel 100 side before the power supply is turned off. In this step therefore, it is determined whether or not there is a communication termination instruction.

If the result of determination in step S231 is that there is not a communication termination instruction, processing returns to step S202. On the other hand, if the result of determination is that there is a communication termination instruction, communication termination processing is carried out (S232) and the lens communication flow is terminated.

In this way, in the flow for lens communication, if there is an aperture control instruction from the camera body side aperture target position and target speed are set, and drive control is carried out (S222-S224). Therefore, drive speed of the aperture motor (aperture stepping motor 112) is controlled so that amount of light that passes through the aperture changes at a constant rate, irrespective of the cam shape of the aperture drive mechanism (S224a). Since rate of change in light amount passing through the aperture is constant, it is possible to prevent brightness of movie and live view display from becoming unnatural.

Also, in the lens communication flow, if an aperture control command is received from the camera body 200, current aperture position and current zoom position are read out, a number of drive steps required to reach the received aperture value from the current aperture value is calculated using a relationship between zoom position and aperture opening amount from the lens memory 131, and drive of the aperture stepping motor 112 is carried out (S221-S224 in FIG. 6). As a result it is possible to accurately control aperture value regardless of zoom position.

Also, in the lens communication flow, in the event that a zoom operation is performed while carrying out aperture control, based on an aperture control command that has been received from the camera body 200, target position of the aperture is updated in accordance with change in focal length based on this zoom operation (S226 and S227 in FIG. 6). As a result it is possible to accurately control to the aperture value that was instructed by the camera body 200.

Figure 7:
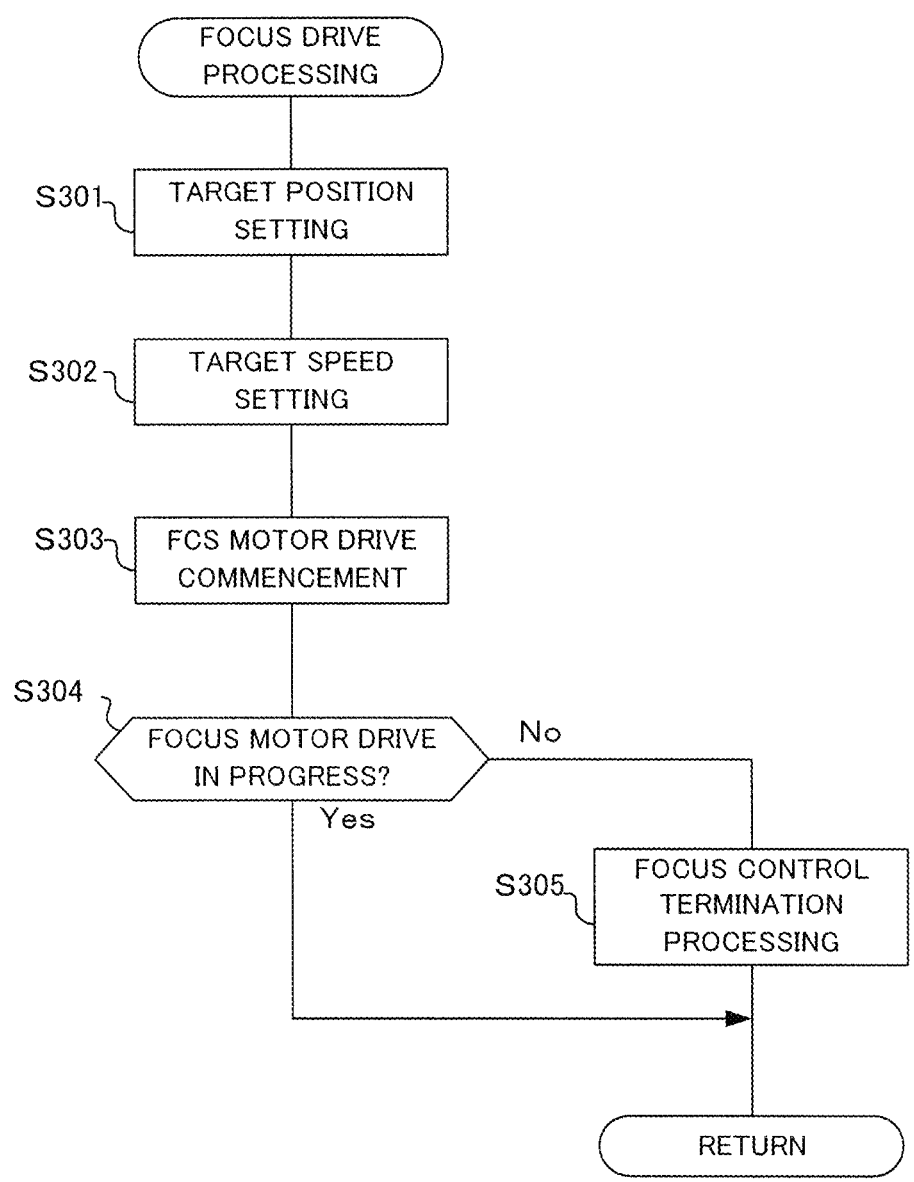
FIG. 7 is a flowchart showing operation of focus drive processing for the lens barrel of one embodiment of the present invention.

Next, operation of the focus drive processing shown in step S205 of FIG. 5 will be described using FIG. 7. If the flow for focus drive processing is entered, target position is set (S301) and target speed is set (S302). In the event that a command for AF processing is transmitted from the camera body 200 side, target position is transmitted along with this command. The focus control section 125 within the lens CPU 120 then sets a number of drive pulses (target position) of the FCS group stepping motor 111 in order to reach the target position, and sets a pulse rate (target speed) until the target position is reached.

If the target position and target speed have been set in steps S301 and S302, drive of the FCS motor is commenced (S303). Here, the FCS group stepping motor 111 is driven by means of the driver 113, and drive of the focus lens group 102 towards the target position commences, Once drive of the FCS motor has commenced, it is next determined whether or not focus motor drive is in progress (S304). The FCS group stepping motor 111 carries out drive by the number of steps that was set in step S301.

If the result of determination in step S304 is that focus motor drive is in progress, focus drive processing is terminated and the originating flow is returned to. On the other hand, if focus motor drive is not in progress focus control termination processing is carried out (S305). Then, once this termination processing is complete, the original processing flow is returned to.

Figure 8:
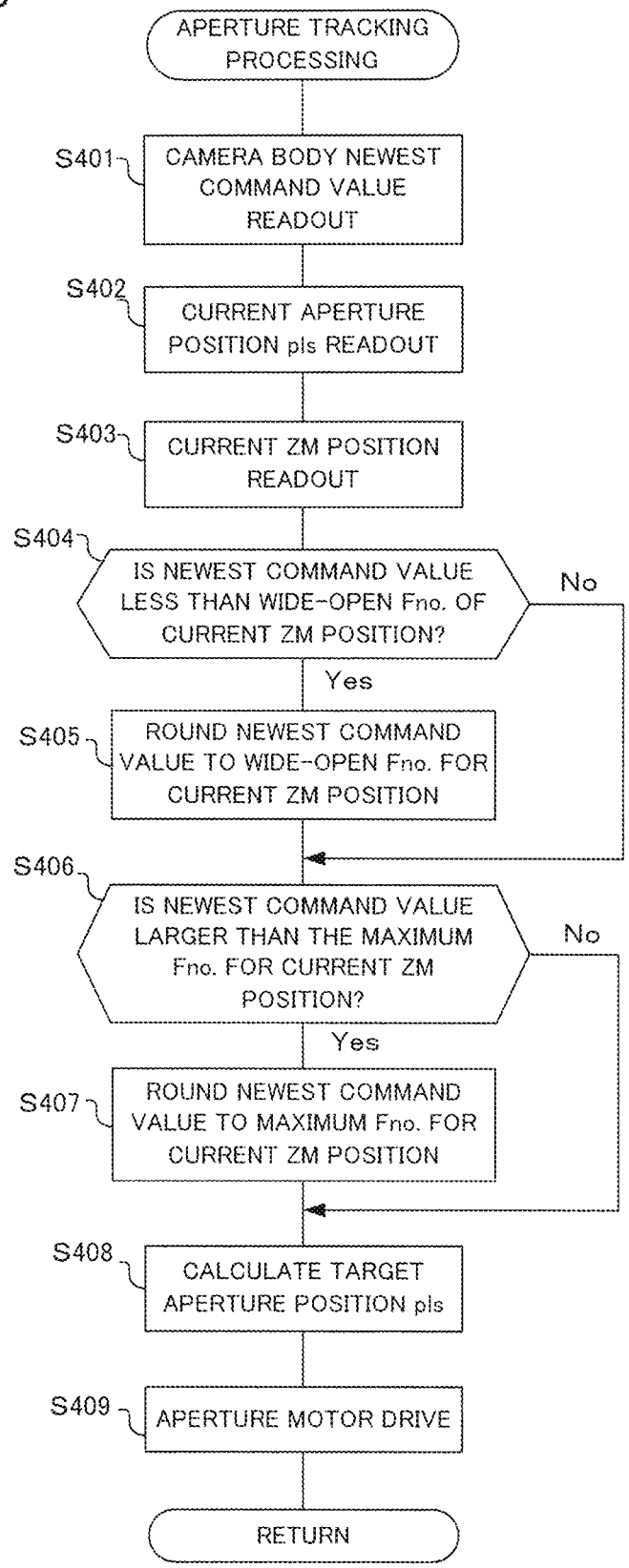
FIG. 8 is a flowchart showing operation of aperture tracking processing for the lens barrel of one embodiment of the present invention.

Next, operation of the aperture tracking processing shown in step S229 in FIG. 6 will be described using FIG. 8. If the flow for aperture tracking processing is entered, first readout of the newest command value of the camera body is carried out (S401). If a command for aperture control is received from the camera body 200, in step S225 an aperture command value is stored in the lens memory 131 or in memory within the lens CPU 120. Here the newest aperture command value that has been stored is read out.

Once the newest command value has been read out, next readout of the current aperture value (current aperture control pulse position) pls is carried out (S402). With this embodiment, since a stepping motor is used for drive of the aperture 106, the current aperture value can be obtained using a count value for number of drive steps of the stepping motor (aperture control pulse position) pls.

Once the current aperture value has been read out, next current zoom (ZM) position readout is carried out (S403). Here the current zoom position is read out based on detection output of the zoom position detection section 114.

It is then determined whether or not the newest command value is less than the wide-open Fno. for the current zoom (ZM) position (S404). Wide-open Fno of the aperture 106 changes depending on focal length, and generally if focal length it becomes long wide-open Fno also becomes large. There may be situations where the aperture value from the camera body 200 that was read out in step S401 can not be set at a currently set focal length that was read out in step S403. In this step therefore, it is determined whether or not the aperture 106 can be set to the aperture value that was set at the camera body 200 side.

If the result of determination in step S404 is that the newest command value is less than the wide-open Fno for the current ZM position, the newest command value is effectively rounded to the wide-open Fno for the current ZM position (S405). Here, since it is not possible to set to the aperture value that was set at the camera body 200 side, the aperture value is made the wide-open Fno for the focal length that is currently set.

If the processing of step S405 has been carried out, or if the result of determination instep S404 is that the newest command value is not less than the wide-open Fno for the current ZM position, it is next determined whether or not the newest command value is larger than the maximum FNo for the current ZM position (S406). It is not possible to further narrow the aperture 106 beyond its narrowest state (maximum FNo), and this maximum FNo varies depending on focal length. In this step therefore, it is determined whether or not the aperture 106 can be set to the aperture value that was set at the camera body 200 side.

If the result of determination in step S406 is that the newest command value is larger than the wide-open Fno for the current ZM position, the newest command value is simply set to the maximum Fno for the current ZM position (S407). Here, since it is not possible to set to the aperture value that was set at the camera body 200 side, the aperture value is made the maximum Fno for the focal length that is currently set.

If the processing of step S407 has been carried out, or if the result of determination in step S406 is that the newest command value is not larger than the maximum FNo for current ZM position, next a target aperture position (aperture control pulse position) pls is calculated (S408). Here, a drive pls number (number of drive steps of the stepping motor, difference between target aperture control pulse position and current aperture control pulse position) required to reach the target aperture value is calculated from position of the zoom lens group and aperture control pulse position that are stored in the lens memory 131, using aperture value that has been instructed from the camera body, current aperture value and current focal length which were read out in steps S401-S403.

If the target aperture position (aperture control pulse position) pls has been calculated, next, aperture motor drive is carried out (S409). Here the aperture control section 124 carries out drive control of the aperture stepping motor 112 by means of the driver 113, and carries out control of the aperture 106.

In this way, in the aperture tracking processing opening amount for aperture value (aperture control pulse position) is controlled in accordance with change in focal length such that even if there is change in focal length due to a zoom operation, the aperture value before this change is maintained. It should be noted that detection of focal length is carried out at a given time interval, and control of opening diameter of the aperture 106 is carried out at this time interval. In the event that the movie record button has been pressed and movie recording is in progress, control of opening diameter of the aperture is made a silent operation.

Next, operation of the speed update processing in step S224a in FIG. 6 will be described using the flowchart shown in FIG. 9.

If the flow for speed update processing is entered, it is first determined whether or not it is time for a speed update (S501). Drive speed of the aperture 106 is updated at a given time. This update time is, for example, a time when image data for a single frame or a plurality of frames has been acquired, and may be a time when the aperture has been driven a given number of steps (for example 10 pls) by the aperture stepping motor 112.

If the result of determination in step S501 is that it is a speed update time, readout of the current aperture motor pulse (pls) is carried out (S505). A number of pulses that have been applied to the aperture stepping motor 112 since the aperture 106 was at a reference position has been stored in memory within the lens CPU 120 etc., and in this step S505 this number of pulses is read out. This number of pulses corresponds to the current aperture value of the aperture 106, which is the control position of the aperture stepping motor.

If the current aperture motor pls has been read out, next calculation of aperture sensitivity is carried out (S506). Aperture sensitivity is stored in the lens memory 131, and so an aperture sensitivity As corresponding to current aperture value (aperture motor pls) that was read out in step S505 is read out. It should be noted that in the case of a zoom lens, a corresponding aperture sensitivity is read out using focal length in addition to current aperture value.

Once aperture sensitivity has been calculated, next motor speed is calculated (S507). Motor speed Vac can be obtained by dividing aperture target speed vs that was input from the camera body 200 in steps S113a and S118 by aperture sensitivity As that was calculated in step S506. Details of this calculation will be described later using FIG. 12 to FIG. 15.

If motor speed has been calculated, next motor control speed update is carried out (S508). Here, the lens CPU 120 sets motor drive speed Vac in the driver 113 by means of the aperture control section 124, and the aperture stepping motor is driven at this drive speed.

Once update of motor control speed has been carried out, or if the result of determination in step S501 is that it is not a speed update time, the flow for speed update processing is terminated and the originating flow is returned to.

In this way, in the flow for speed update processing, characteristics of the aperture drive mechanism are read out from the memory based on aperture value of the aperture (S505, S506), drive speed of the aperture drive section (aperture stepping motor), for driving the aperture drive mechanism so that rate of change of light amount passing through the aperture as a result of opening and closing operations of the aperture is made constant, is calculated based on the characteristics of the aperture drive mechanism (S507), and the aperture drive section is controlled based on the calculated drive speed (S508).

Specifically, in the flow for speed update processing, motor speed is calculated from drive target speed of the motor and aperture sensitivity, and aperture opening amount is controlled so that rate of change in light amount passing through the aperture becomes constant. In other words, in the event that drive speed of the aperture drive motor is constant, then even with an aperture drive mechanism in which speed of change in aperture opening amount does not change constantly, it is possible to make speed of change in aperture opening amount constant by executing the flow for speed update processing, and it is possible to make rate of change in light amount passing through the aperture constant. This means that it is possible to prevent unnatural change in brightness of a subject image, even if aperture value changes at the time of movie shooting or at the time of live view display.

Next a first modified example of the speed update processing will be described using the flowchart shown in FIG. 10. With this modified example, in addition to the control to give constant change in light amount that was described using FIG. 9, it is possible to switch constant aperture motor drive speed control. It should be noted that control to cause light amount passing the aperture to change at a constant rate with designated rate of change in light amount is called constant light amount change rate control. Also, control to make drive speed of the aperture drive motor (aperture stepping motor) a designated constant drive speed is called constant drive speed control.

This modified example only has steps S502 and S504 added to the flow for speed update processing that was shown in FIG. 9, and so description will center on this difference.

If the flow for speed update processing shown in FIG. 10 is entered, it is first determined whether or not it is time for a speed update (S501). If the result of this determination is that it is time for speed update, it is next determined whether or not a command to instruct control for constant change in light amount using a designated rate of change in light amount (light amount constant change command) has been transmitted (S502). In the camera body 200, when carrying out control of drive speed of the aperture 106, it is possible to set control for constant change in light amount or control for constant drive speed, and a command corresponding to the setting is transmitted in steps S113a and S118. In this step determination is in accordance with the command from the camera body 200.

If the result of determination in step S502 is that a constant light amount change command has not been transmitted, an aperture motor speed that has been designated from the body is set (S504). Since aperture motor drive speed at the time of aperture drive is transmitted in steps S113a and S118, drive control of the aperture stepping motor 112 at this drive speed is carried out. Specifically, aperture motor drive speed is set to be constant.

On the other hand, if the result of determination in step S502 is that a constant light amount change command has been transmitted, steps S505 and after are executed. Step S505 and after have been described in detail using FIG. 9 and so detailed description is omitted.

In this way, with the first modified example of speed update processing, at the camera body 200 it is possible to set control for constant change in light amount or control for constant change in drive speed. In situations such as where the photographer is shooting a movie, if control for constant change in light amount is set it is possible to prevent unnatural brightness change during shooting of the movie, and if control for constant change in drive speed is set, then in the case of still picture shooting rapid aperture control is performed and it is possible to minimize shutter time lag.

It should be noted that with this modified example, setting of control for constant change in light amount has been set at the camera body 200 side, but this is not limiting and setting may be performed by means of an operation member (not shown) at the lens barrel 100 side.

Next a second modified example of the speed update processing will be described using the flowchart shown in FIG. 11. With this modified example, it is possible to automatically switch aperture drive control between either control for constant change in light amount or control for constant aperture motor drive speed, depending on whether or not movie mode is set.

This modified example only has steps S503 and S504 added to the flow for speed update processing that was shown in FIG. 9, and so description will center on this difference.

If the flow for speed update processing shown in FIG. 11 is entered, it is first determined whether or not it is time for a speed update (S501). If the result of this determination is that it is time for speed update, it is next determined whether or not movie mode is set (S503). At the camera body 200 side, movie mode is set by operating the movie record button (refer to S116 in FIG. 4), and this information is transmitted at the time of the AE processing of step S118 etc. In this step determination is based on transmission of information from the camera body 200.

If the result of determination in step S503 is not movie mode, the aperture motor speed that has been instructed from the body is set (S504). Since aperture motor drive speed at the time of aperture drive is transmitted in steps S113a and S118, drive control of the aperture stepping motor 112 at this drive speed is carried out. Specifically, aperture motor drive speed is set to be constant.

On the other hand, if the result of determination in step S503 is that movie mode has been transmitted, steps S505 and after are executed. Step S505 and after have been described in detail using FIG. 9 and so detailed description is omitted.

In this way, with the second modified example of the speed update processing, if movie mode has been set at the camera body 200 side, control for constant change in light amount is automatically set, and if still picture mode has been set control for constant change in drive speed of the aperture motor is automatically set. This results in the advantage that all the photographer has to do is decide on shooting mode, and setting relating to aperture drive speed is automatically performed.

Next, control for making change in light amount constant will be described using FIG. 12-FIG. 16.

Figure 12:
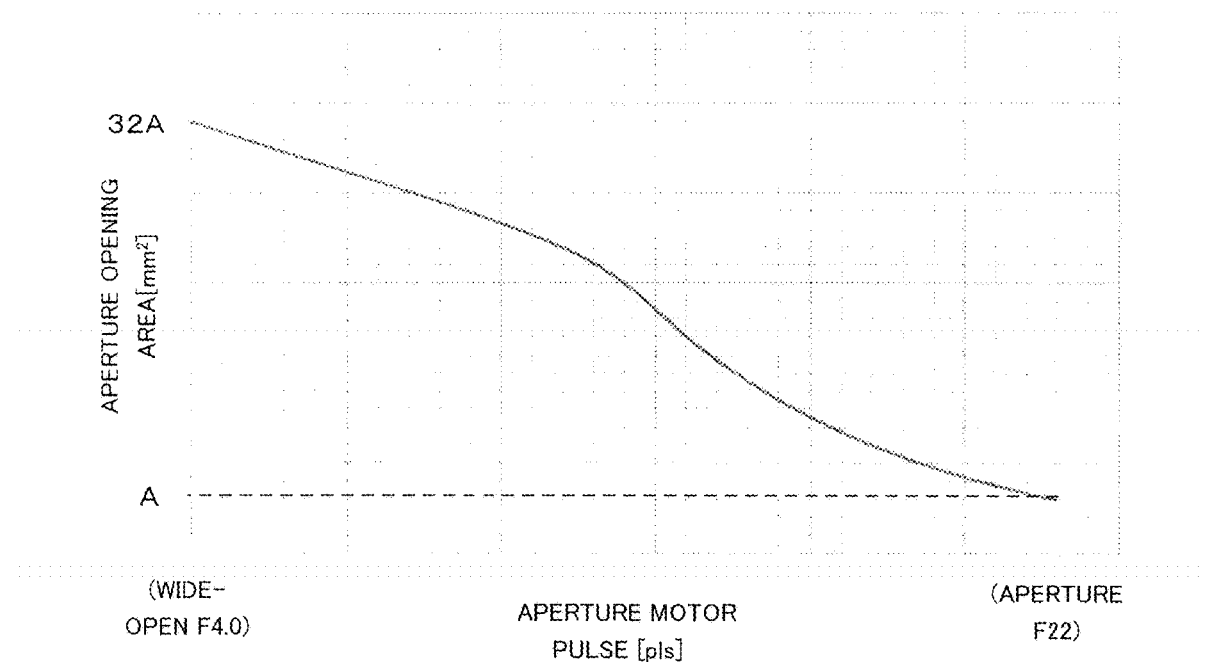
FIG. 12 is a graph showing a relationship between drive amount of an aperture drive motor and aperture opening area, for the lens barrel of the one embodiment of the present invention.

FIG. 12 shows a relationship between aperture motor pulse (pls) and aperture opening area of the aperture drive mechanism of this embodiment. In FIG. 12, the horizontal axis represents number of pulses that have been applied to the aperture stepping motor 112, and corresponds to aperture value. With the example shown in FIG. 12, the left end corresponds to a wide-open aperture value (F=4.0), while the right end corresponds to the smallest aperture value (F=22). Also, the vertical axis represents opening area of the aperture 106, and if area in the case of the smallest aperture value is made A [mm²], area in the case of wide-open aperture value becomes 32 A [mm²]. With this example, this type of aperture opening area characteristic exists because of the characteristics of a cam that drives aperture blades of the aperture 106.

Figure 13:
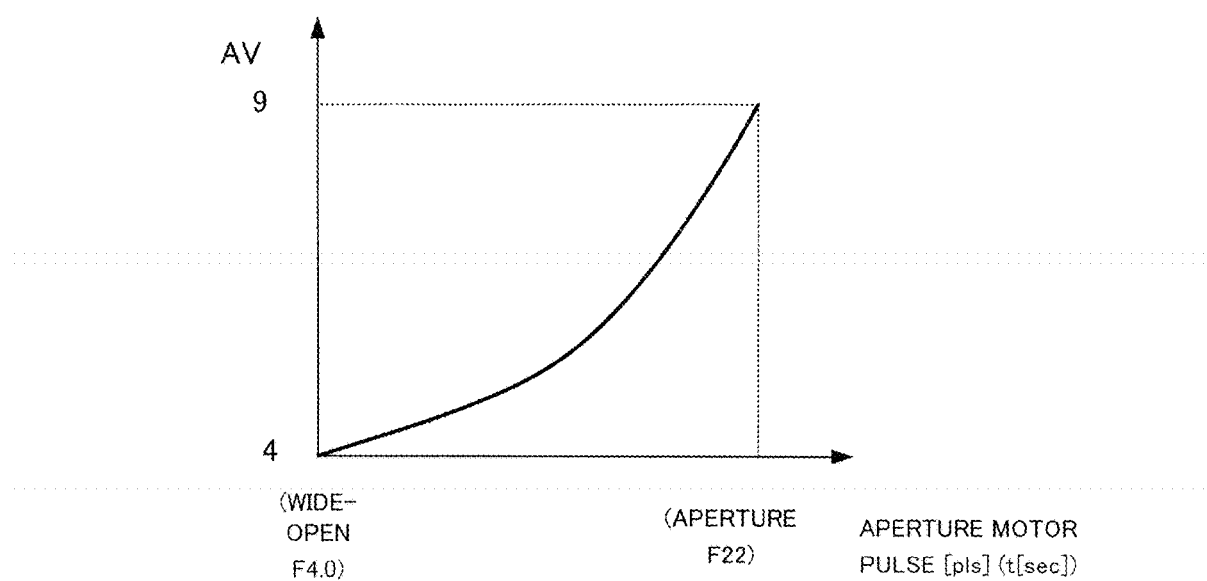
FIG. 13 is a graph showing change of aperture value in a case where the aperture drive motor has been driven at a constant speed, in the lens barrel of the one embodiment of the present invention.

FIG. 13 is an example of constant aperture motor drive control, and shows a case where the aperture stepping motor 112 has been driven at a constant speed. FIG. 13 shows a relationship between aperture motor pulse (pls) and aperture value AV in an aperture drive mechanism having an aperture opening area characteristic such as shown in FIG. 12, when driving the aperture motor at a constant speed with a reference aperture motor speed Var=1000[pps=pls/sec].

Here, rate of change in light amount due to the aperture is a light amount that is changed with respect to a miniscule time, and, if change in aperture value AV is made ΔAV, can be expressed as ΔAV/Δt (1/sec). In FIG. 13, the horizontal axis represents aperture motor pulse (pls), and since aperture motor drive is made constant the horizontal axis can be considered time t. Accordingly, if the horizontal axis is considered to be time t, then the gradient of this graph (ΔAV/Δt) represents rate of change in light amount due to the aperture in the case where the aperture motor is subjected to drive control at a reference aperture motor speed Var.

It should be noted that aperture motor pulse pls=0 on the horizontal axis in FIG. 13 corresponds to wide-open aperture value F4, while aperture motor pulse pls=maximum value corresponds to the smallest aperture value F22. Also, the vertical axis represents aperture value AV (apex value) (with AV4 and AV9 corresponding to F4 and F22 respectively).

In this way, with this embodiment and this modified example, in the case of subjecting the aperture motor to drive control at a constant speed, aperture value changes nonlinearly with respect to change in aperture motor pulse (time), which results in an aperture drive mechanism with which rate of change in light amount is not constant (light amount does not change at a constant rate). Setting of aperture motor speed in step S504 of the previously described first modified example and second modified example (refer to FIG. 10 and FIG. 11) may sometimes result in rate of change in light amount being not constant (light amount does not change at a constant rate).

Processing for controlling the rate of change in light amount to be consistent with rate of change in light amount due to an aperture operation instructed from the camera body will be described based on the conditions of the aperture drive mechanism such as was described using FIG. 12 and FIG. 13. First an overview description will be given.

Figure 14:
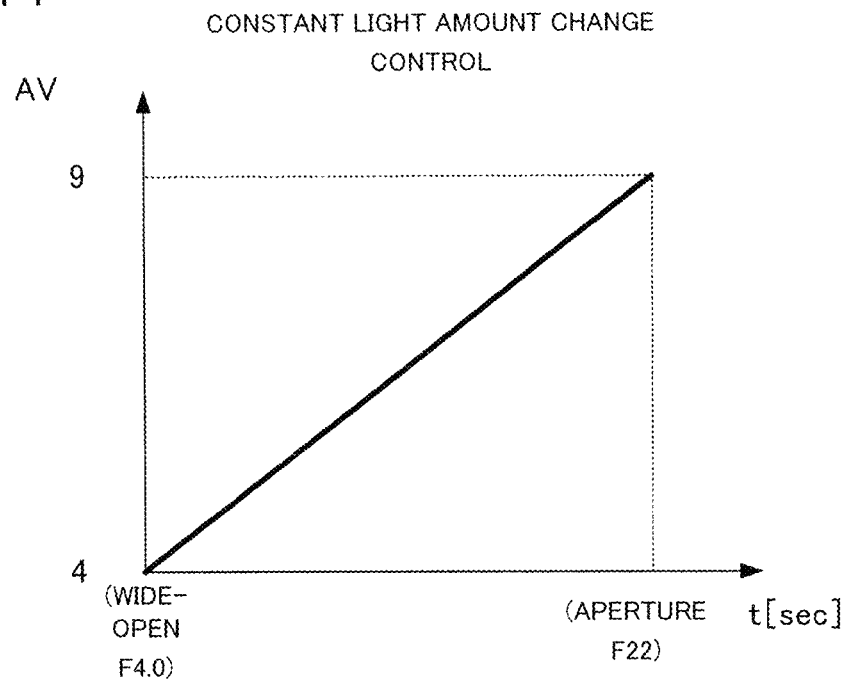
FIG. 14 is a graph for a case where drive speed of the aperture drive motor has been controlled and light amount change for the aperture is made constant, in the lens barrel of the one embodiment of the present invention.

FIG. 14 shows intended constant light amount rate of change control, and shows a characteristic that a gradient, which is rate of change in light amount, is constant. In order to correct rate of change in light amount vd[1/sec] which is the gradient of the constant aperture motor drive speed control for each time in FIG. 13 to gradient for the rate of change in light amount vs[1/sec] that has been instructed from the camera body (FIG. 14), the following calculation is carried out.

Aperture motor corrected speed Vac [pls/sec] is calculated using equation (1) below, by obtaining a correction coefficient (vs/vd) by dividing instructed rate of change in light amount vs by rate of change in light amount vd, which is a gradient of the constant aperture motor drive speed control characteristic at each time, and multiplying reference aperture motor speed Var [pls/sec] by this correction coefficient. [ ] represents units.

$$Vac[\text{pls/sec}] = Var[\text{pls/sec}] \times vs[1/\text{sec}]/vd[1/\text{sec}] \quad (1)$$

Figure 15:
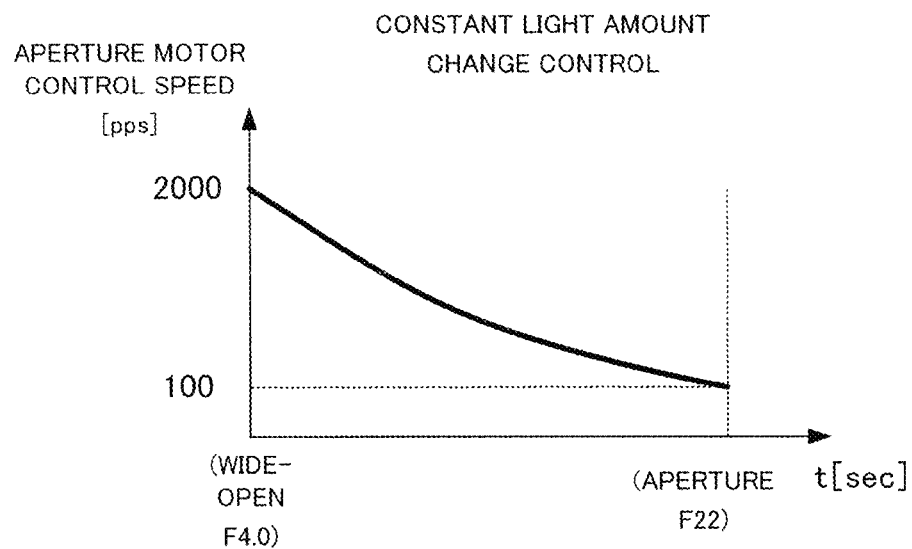
FIG. 15 is a graph showing corrected speed of the aperture drive motor in order to make light amount change for the aperture constant, in the lens barrel of the one embodiment of the present invention.

FIG. 15 schematically shows a characteristic for aperture motor corrected speed Var in a case where reference aperture motor speed Var=1000 pps when constant aperture motor speed control characteristic is measured. It should be noted that in FIG. 15, an aperture operation time from the wide-open aperture value F4 to the smallest aperture value F22 is made the same as aperture operation time from the wide-open aperture value F4 to the smallest aperture value F22 that is required when measuring constant aperture motor speed control characteristic with the reference aperture motor speed Var. The above constitutes an overall processing description.

Next, specific processing will be shown in the following. The lens CPU 120 calculates an aperture motor speed at which rate of change in light amount becomes vs based on rate of change in light amount vs [1/sec] received from the body CPU 201a and aperture sensitivity data which will be explained below.

Figure 16:
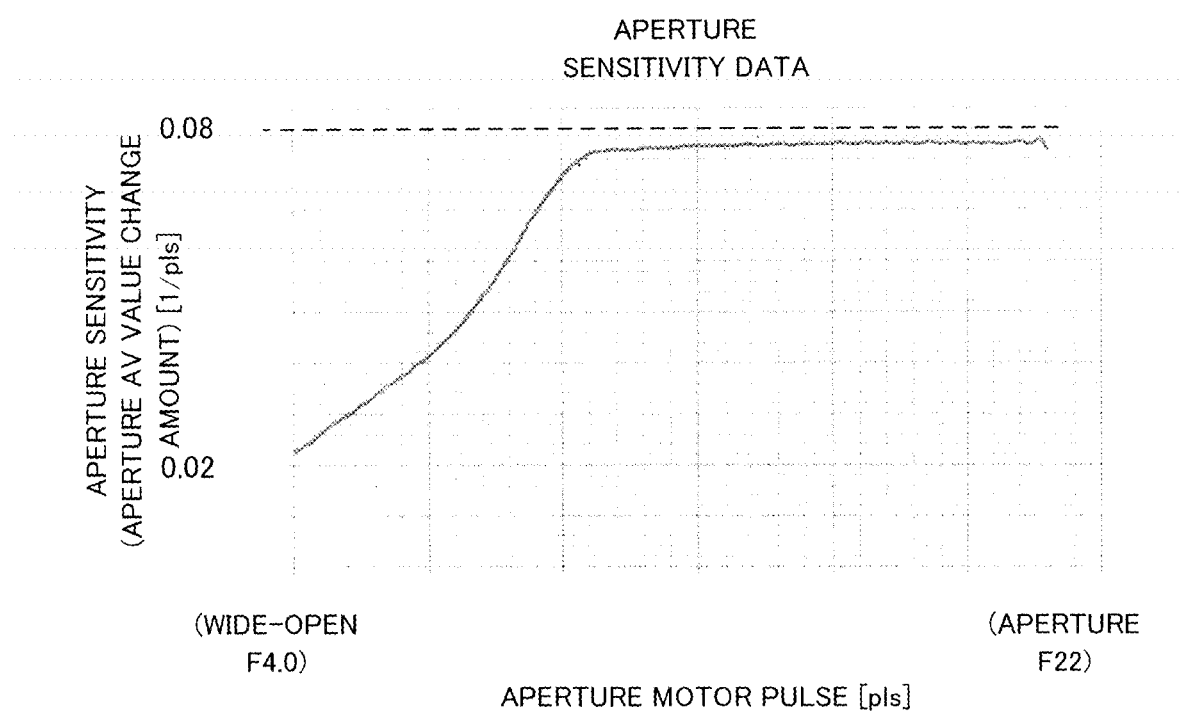
FIG. 16 is a graph showing aperture sensitivity data, in the lens barrel of the one embodiment of the present invention.

FIG. 16 shows aperture sensitivity data stored in the lens memory 131. The aperture sensitivity data, as shown in FIG. 13, is data representing aperture value AV change amount (ΔAV) corresponding to a case where the aperture motor is driven by a single pulse. As a format for the aperture sensitivity data, it is stored as aperture value AV change amount As corresponding to each aperture motor pulse value. Alternatively, aperture motor pulse values may be divided into a plurality of regions, and aperture value change amount stored for each divided region. In this case, for example, an average value for aperture value AV change amounts within the divided regions may be obtained and stored. Alternatively, approximate expressions that are coincident with the characteristic values shown in FIG. 16 may also be stored. It is also possible for this type of aperture sensitivity data to be measured at the manufacturing stage of the interchangeable lens or fixed lens camera for each individual unit, and stored in lens memory 131.

With the one embodiment and modified examples of the present invention, the lens CPU 120 receives rate of change in light amount vs [1/sec] from the body CPU 201*a* when driving the aperture motor (equivalent to the aperture drive speed at the time of the aperture drive of S113*a* and S118 in FIG. 4).

Then, for rate of change in light amount vs that has been instructed from the body, aperture AV value As corresponding to the current aperture motor pulse value is selected from within aperture sensitivity data stored in the lens memory 131, and aperture motor speed Vac is calculated from equation (2) below.

$$Vac[\text{pls/sec}] = vs[1/\text{sec}]/As[1/\text{pls}] \quad (2)$$

The lens CPU 120 selects aperture AV value change amount As corresponding to aperture motor pulse value while driving the aperture motor and calculates the aperture motor speed Vac (FIG. 9: S507). It then becomes possible to control the rate of change of light amount passing through the aperture to a constant value Vs by controlling so as to drive the aperture motor to positions of each aperture motor pulse value at speed Vac (FIG. 9: S508).

As has been described above, with the one embodiment and the modified examples of the present invention, drive speed of the aperture drive mechanism is calculated, based on characteristics of the aperture drive mechanism, so that rate of change in light amount that passes through the aperture due to opening and closing operations of the aperture becomes constant (S505-S507 in FIG. 9), and the aperture drive section is controlled based on the calculated drive speed (S508). As a result it is possible to prevent change in exposure becoming unnatural even at the time of aperture drive.

Also, with the one embodiment and modified examples of the present invention, it is possible to either execute first control to control the aperture drive section so that rate of change in light amount passing through the aperture due to opening and closing operations of the aperture becomes constant, or execute second control to control the aperture drive section independently of characteristics of the aperture drive mechanism. As a result it is possible to have exposure control that is appropriate to movie or still picture operation etc.

It should be noted that in the one embodiment and modified examples of the present invention an aperture target speed is transmitted from the camera body side, but target speed may be appropriately set at the lens barrel side in accordance with characteristics of the aperture unit.

Further, with this embodiment, an imaging apparatus has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, game console etc. In any event, it is possible to adopt the present invention as long as a device has an aperture.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A camera system, comprising a lens unit having a photographing lens, an aperture and an aperture drive mechanism for opening and closing the aperture, and a camera body that is configured to be detachable from or integral with the lens unit, the lens unit comprising:

a memory that stores characteristics of the aperture drive mechanism;

an aperture drive section that drives the aperture drive mechanism; and an aperture control section that, based on the characteristics of the aperture drive mechanism, either executes first control to control the aperture drive section so that rate of change of light amount that passes through the aperture as a result of opening and closing operations of the aperture becomes constant, or executes second control to control the aperture drive section independently of the characteristics of the aperture drive mechanism, and the camera body comprising:

an aperture control instruction section for instructing to the aperture control section using a first aperture instruction to designate rate of change of light amount that passes through the aperture or using a second aperture instruction that does not designate rate of change of light amount that passes through the aperture, and wherein the aperture control instruction section, in a case where the aperture control instruction section has instructed to the aperture control section using the first aperture instruction, executes the first control, wherein:

the camera body has a movie recording mode and a still picture recording mode;

the aperture control instruction section, in the case of the movie recording mode, instructs to the aperture control section using the first aperture instruction; and the aperture control instruction section, in the case of the still picture recording mode, and at the time of still picture shooting operation, instructs to the aperture control section using the second aperture instruction, and the aperture control section executes the second control.

2. The camera system of claim 1, wherein:

each of the first aperture instruction and the second aperture instruction includes an instruction of aperture drive speed; and the aperture control section reads out aperture sensitivity of the aperture drive mechanism corresponding to aperture value from the memory, and calculates drive speed of the aperture drive section using the aperture drive speed and the aperture sensitivity.

3. The camera system of claim 1, wherein:

the aperture control section carries out speed update in accordance with image data read out time, or in accordance with a given amount of movement of the photographing lens.

* * * * *